United States Patent
Borkman et al.

(10) Patent No.: US 11,263,783 B2
(45) Date of Patent: Mar. 1, 2022

(54) COLOR PREDICTION USING MACHINE LEARNING

(71) Applicants: Greg Borkman, North Hollywood, CA (US); Jack Shafer, Corona de Tucson, AZ (US)

(72) Inventors: Greg Borkman, North Hollywood, CA (US); Jack Shafer, Corona de Tucson, AZ (US)

(*) Notice: Subject to any disclaimer, the term of this patent is extended or adjusted under 35 U.S.C. 154(b) by 71 days.

(21) Appl. No.: 16/913,360

(22) Filed: Jun. 26, 2020

(65) Prior Publication Data

US 2020/0410719 A1 Dec. 31, 2020

Related U.S. Application Data

(60) Provisional application No. 62/867,792, filed on Jun. 27, 2019.

(51) Int. Cl.
  *G06T 7/90* (2017.01)
  *G06T 11/00* (2006.01)

(52) U.S. Cl.
  CPC .............. *G06T 7/90* (2017.01); *G06T 11/001* (2013.01); *G06T 2207/10024* (2013.01)

(58) Field of Classification Search
  CPC .................... G06T 7/90; G06T 11/001; G06T 2207/10024
  See application file for complete search history.

(56) References Cited

U.S. PATENT DOCUMENTS

| | | |
|---|---|---|
| 5,850,472 A | 12/1998 | Alston et al. |
| 6,993,512 B2 | 1/2006 | McClanahan |
| 8,913,827 B1 | 12/2014 | Fang |
| 9,406,024 B1 | 8/2016 | Gordon et al. |
| 9,426,333 B2 | 8/2016 | Arai et al. |
| 9,600,908 B2 | 3/2017 | Gordon et al. |
| 10,126,554 B2 | 11/2018 | Benesh et al. |
| 2018/0260668 A1* | 9/2018 | Shen ........................ G06T 11/00 |

FOREIGN PATENT DOCUMENTS

WO  WO-2014051169 A1  4/2014

OTHER PUBLICATIONS

Arai. A Nonlinear Model of Visual Information Processing based on Discrete Maximal Overlap Wavelets. Interdisciplinary Information Sciences 11(2):177-190 (2005).

* cited by examiner

*Primary Examiner* — Christopher Wait
(74) *Attorney, Agent, or Firm* — Wilson Sonsini Goodrich & Rosati

(57) ABSTRACT

The present disclosure provides systems and methods for color prediction. The systems and methods can be configured to utilize machine learning and user input data to generate color transformation process, whereby perceived colors between images may be indistinguishable from one another despite having different color model values, thereby improving and rendering more accurate or desired color perception to an end-user.

20 Claims, 11 Drawing Sheets
(3 of 11 Drawing Sheet(s) Filed in Color)

COLOR PREDICTION USING MACHINE LEARNING

CROSS-REFERENCE

This application claims the benefit of U.S. Provisional Application No. 62/867,792 filed on Jun. 27, 2019, the contents of which are incorporated herein in its entirety.

SUMMARY

The present disclosure provides systems and methods that can account for and adjust color discrepancy, using models (e.g. mathematical constructs) to convert colors without substantial user manual input. Colors on different backgrounds may be perceived by humans to look like different colors when in fact they are the same color (same absolute Red Green Blue values). By using machine learning and user input data, the systems and methods disclosed herein can be configured to utilize the perception of colors from a large set of users so that they may be perceived as substantially the same color. The systems and methods disclosed herein can also adjust the color from one background to another so that they are perceived as the same color despite having different absolute red green blue (RGB) values.

An aspect of the disclosure provides a computer-implemented method for predicting an optimal color. The method may include receiving an input image comprising a first foreground object having a first color. The first foreground object may be superimposed on a first background having a second color. The method may also include receiving a target image comprising a target foreground object superimposed on a target background. The method may further include using a color prediction model to predict a target foreground color for the target foreground object and/or a target background color for the target background object. A visual color perception of (1a) the target foreground object having the target foreground color relative to (1b) the target background having the target background color in the target image, and (2a) the first foreground object having the first color relative to (2b) the first background having the second color in the input image, may appear substantially similar to an observer.

In some embodiments, the visual color perception may comprise RGB values that are each within about 1% to 30%. In some cases, the visual color perception may comprise RGB values that are each within about 1% to 20%. Substantially similar may mean the target image appears to be indistinguishable from the input image.

In some embodiments, the method may further comprise modifying the target foreground object to have the predicted target foreground color. In other cases, the method may further comprise modifying the target background object to have the predicted target background color. In some embodiments, modifying may comprise adjusting the RGB values.

In some embodiments, the color prediction model may comprise machine learning.

In some embodiments, the color ratio of the target image may be substantially proportional to a color ratio of the input image. In some cases, the first color and second color may be different. In some cases, the first color and target foreground may be different. In some cases, the second color and target background color may be different. In some cases, the target foreground color and target background color may be different. In some cases, the first color, second color, target foreground color, and target background color may be all different.

In some embodiments, the first image and target image may be displayed on a user interface. In some embodiments, the first image and target image may be displayed on a computer device. In some cases, the computer device may comprise of smart phones, laptops, desktops, and television monitors.

In some embodiments, the observer may be a human and/or a computer system. In some cases, the observer may be a human. In some cases, the observer may be a computer system.

Another aspect of the disclosure is directed to a method for color prediction. The method may comprise displaying a plurality of images on a graphical user interface to a user. The plurality of images may comprise (1) a first set of baseline images and (2) a second set of adjustable images. The method may also include receiving input RGB values for the second set of adjustable images as the user adjusts/varies the RGB values over a scale such that a color ratio in the adjusted set of second images appears substantially similar to a color ratio in the first set of baseline images. The method may further comprise generating a color prediction model based at least on the input RGB values. The color prediction model can be configured to predict target foreground and/or background colors for any target image comprising a foreground object superimposed onto a background object.

A system for color prediction is provided in another aspect of the disclosure. The system may comprise computer memory configured to receive an input image comprising a first foreground object having a first color. The first foreground object may be superimposed on a first background having a second color. The computer memory can also be configured to receive a target image comprising a target foreground object superimposed on a target background. The system may comprise one or more computer processors operatively coupled to the computer memory and configured to use a color prediction model to predict a target foreground color for the target foreground object and/or a target background color for the target background object. A visual color perception of (1a) the target foreground object having the target foreground color relative to (1b) the target background having the target background color in the target image, and (2a) the first foreground object having the first color relative to (2b) the first background having the second color in the input image, may appear substantially similar to an observer.

In some embodiments, the visual color perception may comprise RGB values that are each within 1% to 30%. In some cases, the visual color perception comprises RGB values that are each within about 1% to 20%. Substantially similar may mean the target image appears to be indistinguishable from the input image.

In some embodiments, the system may further comprise the one or more computer processors may be individually or collectively programmed to modify the target foreground object to have the predicted target foreground color.

In some embodiments, the system may further comprise the one or more computer processors may be individually or collectively programmed to modify the target background object to have the predicted target background color.

In some cases, the one or more computer processors may be individually or collectively programmed to modify comprises the one or more computer processors are individually or collectively programmed to adjust the RGB values.

In some embodiments, the color prediction model may comprise machine learning.

In some embodiments, the color ratio of the target image may be substantially proportional to a color ratio of the input image. In some cases, the first color and second color may be different. In some cases, the first color and target foreground color may be different. In some cases, the first color and target background color may be different. In some cases, the target foreground color and target background color may be different. In some cases, the first color, second color, target foreground color, and target background color may be all different.

In some embodiments, the first image and the target image may be displayed on a user interface. The computer device may comprise of smart phones, laptops, desktops, and television monitors.

In some embodiments, the observer may be a human and/or computer system. In some cases, the observer may be a human. In some cases, the observer may be a computer system.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein), of which:

DETAILED DESCRIPTION

Figure 1:
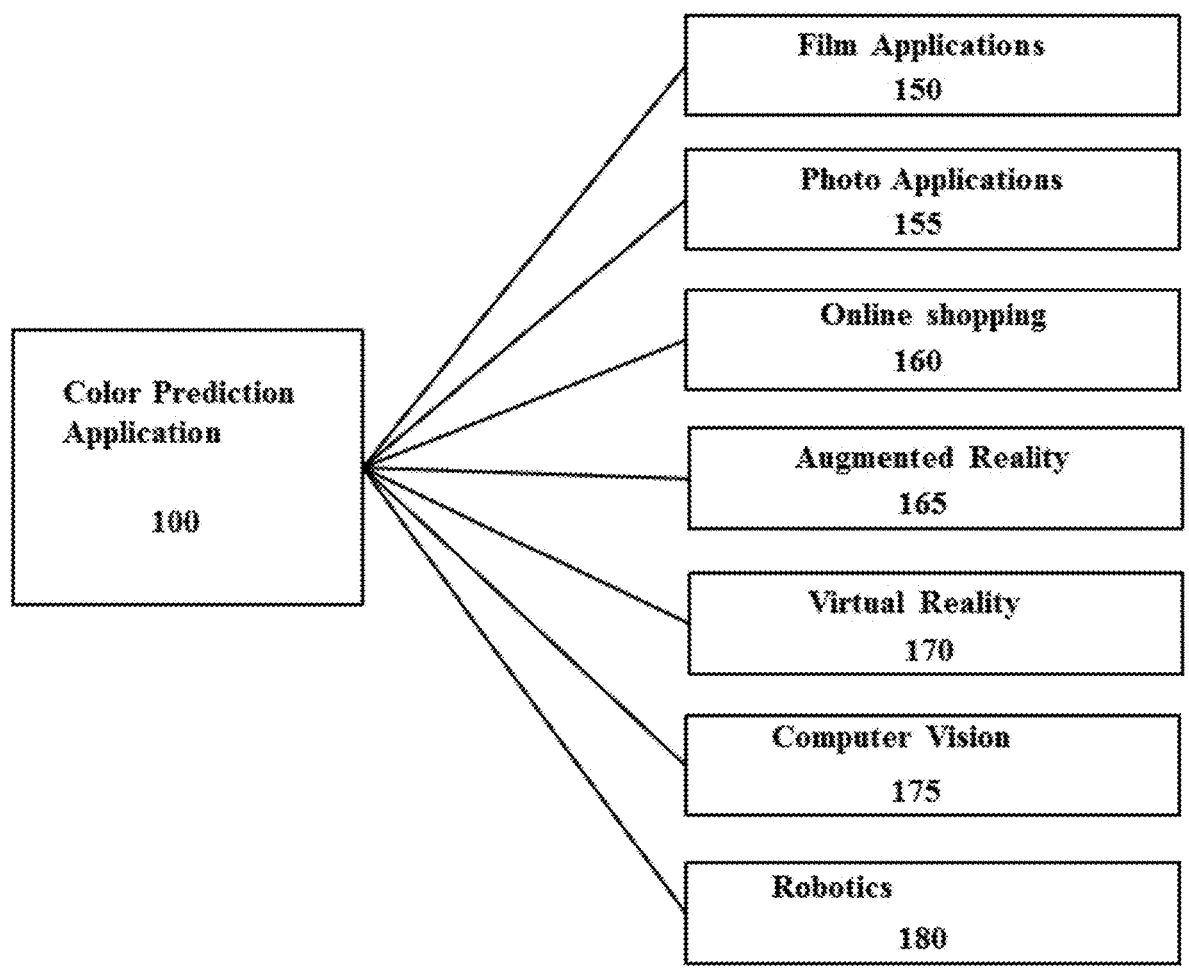
FIG. 1 illustrates a color prediction application and a variety of end-user applications, in accordance with embodiments of the present disclosure.

The Chevreul's illusion is an illusion where bright edges appear to exist between adjacent strips of identical colors having different intensities. This illusion is due to the way people perceive colors. Another similar phenomenon is known as simultaneous contrast where two different colors may affect visual perception due to the spatial relationship between the colors. As a result, applications where colors next to one another may produce a visually different color than anticipated based on the adjacency of two colors, leading to undesired results.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

In an aspect, the present disclosure provides computer systems and methods for predicting the color of a foreground object of a target image using machine learning with user input.

As described elsewhere herein, a smart engine may be utilized to provide audited data for an analysis engine. A smart model may comprise a console. A console may be provided where the smart engine may gather image data. The console may present a user with an image that comprises a background color and a foreground color, as well as a separate image with a second background color and a second foreground color. The images and color model values of the console may be computer generated or externally collected images (images obtained through a medium, for example, photo-camera, video-camera, smartphone-camera, scanner, or drawing, etc.). The user then adjusts the color model values of the target foreground color relative to the target background color until the user believes they have visually matched the color of the first foreground color relative to the first background color so that they have the same visual color perception (i.e., for example, the way the human visual cortex interprets what color is being reflected to the human eye) and appears substantially similar to an end-user. The new color model values are then stored. These steps are repeated with a variety of different color combinations from a variety of different users.

In some cases, the smart engine utilizes a color model. The color model may be the CIE XYZ color model. In some cases, the color model may be CIELAB color model. In some cases, the color model may be for example, a subtractive color model or additive color model. An additive color model may use red, green, and blue (RGB) values. A subtractive color model may use cyan, magenta, yellow, and black (CMYB). The color model may be a HSV color model that describes colors in hue, saturation, and value (HSV). The color model may be a HSL color model that describes colors in hue, saturation, and lightness (HSL). The color model may be a grayscale model where the pixel of a grayscale image has a brightness value ranging from 0 (black) to 255 (white). The color model may be converted into a different color model. More than one color model may be utilized.

The console of the smart model may receive the color model values of 1 image, 2 images, 3 images, 5 images, 10 images, 100 images, 10000 images, 100000 images, 1000000 images or more. The smart model may receive the color model values of 1 to 1000000 images, 1 to 100000 images, 1 to 10000 images, 1 to 1000 images, 1 to 100 images, 1 to 10 images, or 1 to 5 images. The smart model may generate new color model values on the target image. The new color model values on the target image may have the same pixel location as the color model values of the first image. The new color model values on the target image may have different pixel location than the color model values of the first image. The new color model values may be computer generated. The new color model values may be manually generated. The new color model values may be generated manually to match visually to the subset of an image by user as described elsewhere herein.

The image provided to a console may be an arbitrary image representing, for example, a design, a photograph, cosmetic products, consumer goods, background drop, people, shapes, letters, computer generated images, biological and medical images, distorted or damaged images, etc. In some embodiments, the image need not be a still image. For example, video comprising a plurality or series of moving images may be provided to the console.

In some cases, the image provided to the smart engine may be a digital image. In some cases, the image may be a computer generated image. The file format of the image may be, for example, a raster format image or vector format image. Such raster image file formats may be but not limited to: JPEG (Joint Photographic Experts Group), JFIF (JPEG File Interchange Format), JPEG 2000, Exif (Exchangeable image file format), SPIFF (Still Picture Interchange File Format), TIFF (Tagged Image File Format), GIF (Graphics Interchange Format), BMP (Windows bitmap), PNG (Portable Network Graphics), PPM (portable pixmap file format), PGM (portable graymap file format), PBM (portable bitmap file format), PNM (Portable aNy Map), WebP, HDR raster formats, HEIF (High Efficiency Image File Format), BAT, BPG (Better Portable Graphics), DEEP, DRW (Drawn File), ECW (Enhanced Compression Wavelet), FITS (Flexible Image Transport System), FLIF (Free Lossless Image Format), ICO, ILBM, IMG (ERDAS IMAGINE Image), IMG (Graphics Environment Manager image file), JPEG XR, layered image file format, Nrrd (Nearly raw raster data), PAM (Portable Arbitrary Map), PCX (Personal Computer eXchange), PGF (Progressive Graphics File), PLBM (Planar Bitmap), SGI, SID, Sun Raster, TGA (TARGA), VICAR (NASA/JPL image transport format), XISF (Extensible Image Serialization Format), AFPhoto (Affinity Photo Document), CD5 (Chasys Draw Image), CPT (Corel Photo Paint), PSD (Adobe PhotoShop Document), PSP (Corel Paint Shop Pro), XCF (eXperimental Computing Facility format), and PDN (Paint Dot Net). Such vector formats may be but not limited to: CGM (Computer Graphics Metafile), Gerber format (RS-274X), SVG (Scalable Vector Graphics), AFDesign (Affinity Designer document), AI (Adobe Illustrator Artwork), CDR (CorelDRAW), DrawingML, GEM metafiles, Graphics Layout Engine, HPGL, HVIF (Haiku Vector Icon Format), MathML, NAPLPS (North American Presentation Layer Protocol Syntax), ODG (OpenDocument Graphics), !DRAW, QCC, ReGIS, Remote imaging protocol, VML (Vector Markup Language), Xar format, XPS (XML Paper Specification), AMF (Additive Manufacturing File Format), Asymptote, .blend, COLLADA, .dgn, .dwf, .dwg, .dxf, eDrawings, .flt, FVRML, FX3D, HSF, IGES, IMML (Immersive Media Markup Language), IPA, JT, .MA (Maya ASCII format), .MB (Maya Binary format), .OBJ (Alias| Wavefront file format), OpenGEX (Open Game Engine Exchange), PLY, POV-Ray scene description language, PRC, STEP, SKP, STL (stereolithography format), U3D (Universal 3D file format), VRML (Virtual Reality Modeling Language), XAML, XGL, XVL, xVRML, X3D, 0.3D, 3DF, 0.3DM, 0.3ds, 3DXML, and X3D. In some cases, the digital image file format may be a compound format that uses both pixel and vector data.

In some cases, the smart engine may use wavelets to represent images. In some cases, wavelets may be used as a medium to receive data from an image. A wavelet may be decomposed using a biorthogonal wavelet filter bank with horizontal, vertical, and diagonal orientations or a pinwheel framelet with multiple orientations. In some cases, a pinwheel framelet may be, for example, a model of simple cells in the human visual cortex. A wavelet may be used to reconstruct an image by summing the subband signals. In some cases, a wavelet may be but not limited to a classical wavelet. In some cases, the decomposing of the wavelet may include a coefficient processing step. The coefficient processing step may be between a decomposition phase and a synthesis phase in the multiresolution decomposition. In some cases, decomposition detail coefficients may be normalized between the decomposition phase and the synthesis phase. In some cases, the multiresolution decomposition may be maximal overlap multiresolution decomposition, maximally decimated multiresolution decomposition, or partially decimated and partially overlapping multiresolution decomposition. In some cases, an image data may be edited and control may be performed such that the multiresolution decomposition may be performed on the edited image data, a ratio or difference between the reconstructed image data obtained from the edited image data and the image data that is unedited may be calculated as the amount of illusion and editing may be repeatedly performed such that the amount of illusion may be reduced. In some cases, editing may be repeatedly performed such that the amount of illusion may be given a numerical value. This may lead to an image with an arbitrary amount of illusion, such as an image with a large amount of illusion or an image with a small amount of illusion, may be created.

In some cases, the smart engine may receive the color model values of an entire image, a subset of an image, or a combination thereof. The subset of color model values may have different color model values than at least about 1%, 2%, 3%, 4%, 5%, 10%, 12%, 15%, 17%, 20%, 22%, 25%, 27%, 30%, 32%, 35%, 37%, 40%, 42%, 45%, 46%, 47%, 48%, 49%, 50%, 52%, 54%, 56%, 58%, 60%, 62%, 64%, 66%, 68%, 70%, 72%, 74%, 76%, 78%, 80%, 82%, 84%, 86%, 88%, 90%, 92%, 94%, 96%, 98%, 99% of the overall image. The subset of color model values may have different color model values than at most about 99%, 98%, 96%, 94%, 92%, 90%, 88%, 86%, 84%, 82%, 80%, 78%, 76%, 74%, 72%, 70%, 68%, 66%, 64%, 62%, 60%, 58%, 56%, 54%, 52%, 50%, 49%, 47%, 46% 45%, 42%, 40%, 37%, 35%, 32%, 30%, 27%, 25%, 22%, 20%, 17%, 15%, 12%, 10%, 7%, 5%, 4%, 3%, 2% or less of the overall image. The subset of color model values may have different color model values from about 1% to 99%, 1% to 98%, 1% to 96%, 1% to 94%, 1% to 92%, 1% to 90%, 1% to 88%, 1% to 86%, 1% to 84%, 1% to 82%, 1% to 80%, 1% to 78%, 1% to 76%, 1% to 74%, 1% to 72%, 1% to 70%, 1% to 68%, 1% to 66%, 1% to 64%, 1% to 62%, 1% to 60%, 1% to 58%, 1% to 56%, 1% to 54%, 1% to 52%, 1% to 50%, 1% to 49%, 1% to 45%, 1% to 40%, 1% to 35%, 1% to 30%, 1% to 25%, 1% to 20%, 1% to 15%, 1% to 10%, 1% to 5%, 1% to 3%, 5% to 99%, 5% to 98%, 5% to 96%, 5% to 94%, 5% to 92%, 5% to 90%, 5% to 88%, 5% to 86%, 5% to 84%, 5% to 82%, 5% to 80%, 5% to 78%, 5% to 76%, 5% to 74%, 5% to 72%, 5% to 70%, 5% to 68%, 5% to 66%, 5% to 64%, 5% to 62%, 5% to 60%, 5% to 58%, 5% to 56%, 5% to 54%, 5% to 52%, 5% to 50%, 5% to 49%, 5% to 45%, 5% to 40%, 5% to 35%, 5% to 30%, 5% to 25%, 5% to 20%, 5% to 55%, 5% to 50%, 10% to 99%, 10% to 98%, 10% to 96%, 10% to 94%, 10% to 92%, 10% to 90%, 10% to 88%, 10% to 86%, 10% to 84%, 10% to 82%, 10% to 80%, 10% to 78%, 10% to 76%, 10% to 74%, 10% to 72%, 10% to 70%, 10% to 68%, 10% to 66%, 10% to 64%, 10% to 62%, 10% to 60%, 10% to 58%, 10% to 56%, 10% to 54%, 10% to 52%, 10% to 50%, 10% to 49%, 10% to 45%, 10% to 40%, 10% to 35%, 10% to 30%, 10% to 25%, 10% to 20%, 10% to 15%, 20% to 49%, 20% to 45%, 20% to 40%, 20% to 35%, 20% to 30%, 20% to 25%, 30% to 49%, 30% to 45%, 30% to 40%, or 30% to 35% of the overall image.

In some cases, the new color model values of the smart engine may be audited. The new color model values may be audited to visually match to the subset color model values of an image so that the visual perception of the target image and the input image are substantially similar. Visually match as described herein may be based on a human visual cortex's ability to perceive hue, brightness, and saturation discrepancies between two color model values being reflected to the human eye. The auditor reviews the color model values selected by the user and agrees, declines, or changes the color model values of an image. In some cases, the new color model values from the smart model may be audited using, for example, by a computer, a person or people, machine learning or a combination thereof. The machine learning may be, for example, unsupervised learning, supervised learning, or a combination thereof. The unsupervised learning may be, for example, clustering, hierarchical clustering, k-means, mixture models, DBSCAN, OPTICS algorithm, anomaly detection, local outlier factor, neural networks, autoencoders, deep belief nets, hebbian learning, generative adversarial networks, self-organizing map, expectation-maximization algorithm (EM), method of moments, blind signal separation techniques, principal component analysis, independent component analysis, non-negative matrix factorization, singular value decomposition, or a combination thereof. The supervised learning may be, for example, support vector machines, linear regression, logistic regression, linear discriminant analysis, decision trees, k-nearest neighbor algorithm, neural networks, similarity learning, or a combination thereof. The person or people may be, for example, a color specialist, film director, color designer, general person/people, or a combination thereof, etc. The audited new color model values may be used to predict parameters for other new color model values.

The smart engine may implement a method to reduce the number of colors presented to a user when selecting a color for the foreground object of the target image. The method may calculate a color model value range to present to a user. A range may be a subset of color model values, for example, in a RGB color model, red, blue, and green, generally have color model values ranging from 0 to 255, based on the color model values of the image and target image, the method may reduce the range for red, blue, and/or green to 0 to 245, 0 to 235, 0 to 225, 0 to 215, 0 to 205, 0 to 195, 0 to 185, 0 to 175, 0 to 165, 0 to 155, 0 to 145, 0 to 135, 0 to 125, 0 to 115, 0 to 105, 0 to 95, 0 to 85, 0 to 75, 0 to 65, 0 to 55, 0 to 45, 0 to 35, 0 to 25, 0 to 15, 0 to 5, 20 to 245, 20 to 235, 20 to 225, 20 to 215, 20 to 205, 20 to 195, 20 to 185, 20 to 175, 20 to 165, 20 to 155, 20 to 145, 20 to 135, 20 to 125, 20 to 115, 20 to 105, 20 to 95, 20 to 85, 20 to 75, 20 to 65, 20 to 55, 20 to 45, 20 to 35, 20 to 25, 40 to 245, 40 to 235, 40 to 225, 40 to 215, 40 to 205, 40 to 195, 40 to 185, 40 to 175, 40 to 165, 40 to 155, 40 to 145, 40 to 135, 40 to 125, 40 to 115, 40 to 105, 40 to 95, 40 to 85, 40 to 75, 40 to 65, 40 to 55, 40 to 45, 60 to 245, 60 to 235, 60 to 225, 60 to 215, 60 to 205, 60 to 195, 60 to 185, 60 to 175, 60 to 165, 60 to 155, 60 to 145, 60 to 135, 60 to 125, 60 to 115, 60 to 105, 60 to 95, 60 to 85, 60 to 75, 60 to 65, 80 to 245, 80 to 235, 80 to 225, 80 to 215, 80 to 205, 80 to 195, 80 to 185, 80 to 175, 80 to 165, 80 to 155, 80 to 145, 80 to 135, 80 to 125, 80 to 115, 80 to 105, 80 to 95, 80 to 85, 100 to 245, 100 to 235, 100 to 225, 100 to 215, 100 to 205, 100 to 195, 100 to 185, 100 to 175, 100 to 165, 100 to 155, 100 to 145, 100 to 135, 100 to 125, 100 to 115, 100 to 105, 80 to 95, 80 to 85, 120 to 245, 120 to 235, 120 to 225, 120 to 215, 120 to 205, 120 to 195, 120 to 185, 120 to 175, 120 to 165, 120 to 155, 120 to 145, 120 to 135, 120 to 125, 140 to 245, 140 to 235, 140 to 225, 140 to 215, 140 to 205, 140 to 195, 140 to 185, 140 to 175, 140 to 165, 140 to 155, 160 to 245, 160 to 235, 160 to 225, 160 to 215, 160 to 205, 160 to 195, 160 to 185, 160 to 175, 160 to 165, 180 to 245, 180 to 235, 180 to 225, 180 to 215, 180 to 205, 180 to 195, 180 to 185, 200 to 245, 200 to 235, 200 to 225, 200 to 215, 200 to 205, 220 to 245, 220 to 235, 220 to 225, or 240 to 245. The method may reduce the range of color model values for any color model, for example, CIE XYZ, CIELAB, RGB, CMYB, HSV, HSL, or grayscale, etc. The range may be dependent on the end-user application. The range may be dependent on the color model values of the images received by the smart engine. The range may be dependent on the user. The range may be dependent on the possible color model values for making a visually matching color. The range may be dependent on a numerical value. The range may be dependent on the input from an auditor. The range may be calculated. The range may be dependent on incoming data from an image. The range may be predetermined.

The smart engine may be tailored depending on an end-user application. The smart engine, for example, may require more audited color model values for one end-user application than another end-user application. The smart engine, for example, may require a larger subset of an image color model values for one end-user application than another end-user application. The smart engine, for example, may have a different and/or specific person or people to audit the color model values for one end-user application than another end-user application. The smart engine, for example, may be trained for different shapes. The smart engine, for example, may be trained by a different and/or specific set of images for one end-user application than another end-user application. For example, an end-user application may be cosmetics, in particular may be colors of makeup on people. The smart engine may be trained on various images that pertain to makeup color. These images, for example, may regard the skin tone color of a person, the color of the makeup on the person, or the skin tone color of different people, etc. These images may then be used to predict a visually matching makeup color for a different person.

The audited color model values may be used to feed an analysis engine in order to determine the fit of the new color model values. The fit may be used to extrapolate data (e.g color model values). The fit may be a curve fit. The curve fit may involve, for example, interpolation, smoothing, or a combination thereof, etc. The fit of the new color model values may be determined by an analysis method, for example, regression analysis. A wide variety of programs may be used to determine the fit, for example, R, GNU Scientific Library, MLAB, Maple, MATLAB, Mathematica, GNU Octave, SciPy, NumPy, in-house software, or a combination thereof, etc. A fit may have an acceptable error. The acceptable error can be provided as a percentage value or within a range of percentages. For example, the error may be at least about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30% or more. The error may be at most about 30%, 29%, 28%, 27% 26%, 25%, 24%, 23%, 22%, 21%, 20%, 19%, 18%, 17%, 16%, 15%, 14%, 13%, 12%, 11%, 10%, 9%, 8%, 7%, 6%, 5%, 4%, 3%, or less. The error may be between about 1% to 30%, 1% to 29%, 1% to 28%, 1% to 27%, 1% to 26%, 1% to 25%, 1% to 24%, 1% to 23%, 1% to 22%, 1% to 21%, 1% to 20%, 1% to 19%, 1% to 18%, 1% to 17%, 1% to 16%, 1% to 15%, 1% to 14%, 1% to 13%, 1% to 12%, 1% to 11%, 1% to 10%, 1% to 9%, 1% to 8%, 1% to 7%, 1% to 6%, 1% to 5%, 1% to 4%, 1% to 3%, 1% to 2%, 3% to 30%, 3% to 29%, 3% to 28%, 3% to 27%, 3% to 26%, 3% to 25%, 3% to 24%, 3% to 23%, 3% to 22%, 3% to 21%, 3% to 20%, 3% to 19%, 3% to 18%, 3% to 17%, 3% to 16%, 3% to 15%, 3% to 14%, 3% to 13%, 3% to 12%, 3% to 11%, 3% to 10%, 3% to 9%, 3% to 8%, 3% to 7%, 3% to 6%, 3% to 5%, 3% to 4%, 5% to 30%, 5% to 29%, 5% to 28%, 5% to 27%, 5% to 26%, 5% to 25%, 5% to 24%, 5% to 23%, 5% to 22%, 5% to 21%, 5% to 20%, 5% to 19%, 5% to 18%, 5% to 17%, 5% to 16%, 5% to 15%, 5% to 14%, 5% to 13%, 5% to 12%, 5% to 11%, 5% to 10%, 5% to 9%, 5% to 8%, 5% to 7%, 5% to 6%, 10% to 30%, 10% to 29%, 10% to 28%, 10% to 27%, 10% to 26%, 10% to 25%, 10% to 24%, 10% to 23%, 10% to 22%, 10% to 21%, 10% to 20%, 10% to 19%, 10% to 18%, 10% to 17%, 10% to 16%, 10% to 15%, 10% to 14%, 10% to 13%, 10% to 12%, 10% to 11%, 15% to 30%, 15% to 29%, 15% to 28%, 15% to 27%, 15% to 26%, 15% to 25%, 15% to 24%, 15% to 23%, 15% to 22%, 15% to 21%, 15% to 20%, 15% to 19%, 15% to 18%, 15% to 17%, 15% to 16%, 20% to 30%, 20% to 29%, 20% to 28%, 20% to 27%, 20% to 26%, 20% to 25%, 20% to 24%, 20% to 23%, 20% to 22%, 20% to 21%, 25% to 30%, 25% to 29%, 25% to 28%, 25% to 27%, or 25% to 26%.

The analysis model may be divided into components that adequately describe each color model value. For example, in a RGB color model, the analysis model may comprise a red analysis, green analysis, and a blue analysis where an analysis function may be performed for each set of color model values. Each analysis may use a different analysis method or the same analysis method as described elsewhere herein.

The model for the regression analysis may be, for example, a linear regression, simple regression, polynomial regression, general linear model, generalized linear model, discrete choice, logistic regression, multinomial logit, mixed logit, probit, multinomial probit, ordered logit, ordered probit, poisson, multilevel model, fixed effects, random effects, mixed model, nonlinear regression, nonparametric, semiparametric, robust, quantile, isotonic, principal components, least angle, local segmented, errors-in-variables, or a combination thereof.

The estimation for the regression analysis may be, for example, least squares, linear, nonlinear, ordinary, weighted, generalized, partial, total, non-negative, ridge regression, regularized, least absolute deviations, iteratively reweighted, bayesian, bayesian multivariate, or a combination thereof, etc.

The analysis engine may have a variable amount of input variables. The analysis engine may have at least 1, 2, 3, 4, 5, 6, 7, 8, 9, 10, 11, 12, 13, 14, 15, 20, 25, 30, 35, 40, 45, 50, 55, 60, 65, 70, 75, 80, 85, 90, 95, 100, 1000, 10000, 100000, 1000000, 10000000, 100000000, 1000000000, or more input variables. The analysis engine may have at most 1000000000, 100000000, 10000000, 1000000, 100000, 10000, 1000, 100, 95, 90, 85, 80, 75, 70, 65, 60, 55, 50, 45, 40, 35, 30, 25, 20, 15, 14, 13, 12, 11, 10, 9, 8, 7, 6, 5, 4, 3, 2, or 1 input variables. The analysis engine may have between 1 to 1000000000, 1 to 100000000, 1 to 10000000, 1 to 1000000, 1 to 100000, 1 to 10000, 1 to 1000, 1 to 100, 1 to 10, 1 to 5, 1 to 4, 1 to 3, 5 to 1000000000, 5 to 100000000, 5 to 10000000, 5 to 1000000, 5 to 100000, 5 to 10000, 5 to 1000, 5 to 100, 5 to 10, 5 to 9, 5 to 8, 5 to 7, 8 to 1000000000, 8 to 100000000, 8 to 10000000, 8 to 1000000, 8 to 100000, 8 to 10000, 8 to 1000, 8 to 100, 8 to 50, 8 to 40, 8 to 30, 8 to 20, 8 to 15, 8 to 12, 9 to 1000, 9 to 900, 9 to 800, 9 to 700, 9 to 600, 9 to 500, 9 to 400, 9 to 300, 9 to 200, 9 to 100, 9 to 90, 9 to 80, 9 to 70, 9 to 60, 9 to 50, 9 to 40, 9 to 30, 9 to 20, 9 to 18, 9 to 15, 9 to 13, 9 to 11 input variables.

The audited color model values may be used to feed an analysis engine in order to determine the color parameters for the color prediction engine. The input variables for the color prediction engine may be, for example, color parameters (e.g. color model values). The color prediction engine may be used to predict the final color model values. The color prediction model of the color prediction engine may be a linear, quadratic, cubic, quartic, quintic, any $n^{th}$ degree model (where n may be 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 55, 60, 65, 70, 75, 80, 85, 90, 95, 100, 150, 200, 250, 300, 350, 400, 450, 500, 1000, 10000, 100000, or more), or a combination thereof (e.g. cubic and linear; quartic and quadratic; quadratic and linear; $9^{th}$ and quadratic; $45^{th}$ and linear; quintic, cubic, and linear; $50^{th}$, $32^{nd}$, quartic and quadratic; $500^{th}$, $100^{th}$, $12^{th}$, quadratic and linear; etc). The color prediction engine may be scaled by the color parameters from the analysis engine, manually by an auditor, with a machine learning algorithm as described else herein, or a combination thereof. The analysis engine/model may include a least squares method (for example, a damped least-squares (DLS) method). In some embodiments, the analysis engine/model may include the following functions, for example, In some cases, the image provided to the color prediction engine may be a digital image. In some cases, the image may be a computer generated image. The file format of the image may be, for example, a raster format image or vector format image. Such raster image file formats may be but not limited to: JPEG (Joint Photographic Experts Group), JFIF (JPEG File Interchange Format), JPEG 2000, Exif (Exchangeable image file format), SPIFF (Still Picture Interchange File Format), TIFF (Tagged Image File Format), GIF (Graphics Interchange Format), BMP (Windows bitmap), PNG (Portable Network Graphics), PPM (portable pixmap file format), PGM (portable graymap file format), PBM (portable bitmap file format), PNM (Portable aNy Map), WebP, HDR raster formats, HEIF (High Efficiency Image File Format), BAT, BPG (Better Portable Graphics), DEEP, DRW (Drawn File), ECW (Enhanced Compression Wavelet), FITS (Flexible Image Transport System), FLIF (Free Lossless Image Format), ICO, ILBM, IMG (ERDAS IMAGINE Image), IMG (Graphics Environment Manager image file), JPEG $$\text{argmin}_{RedCoe} \sum_{m=1}^{n} [J_m - f(A_m, B_m, C_m, D_m, E_m, F_m, G_m, H_m, I_m, RedCoe_m)]^2 = [RedCoe_1, RedCoe_p]$$

$$\text{argmin}_{GreenCoe} \sum_{m=1}^{n} [K_m - f(A_m, B_m, C_m, D_m, E_m, F_m, G_m, H_m, I_m, GreenCoe_m)]^2 = [GreenCoe_1, GreenCoe_p]$$

$$\text{argmin}_{BlueCoe} \sum_{m=1}^{n} [L_m - f(A_m, B_m, C_m, D_m, E_m, F_m, G_m, H_m, I_m, BlueCoe_m)]^2 = [BlueCoe_1, BlueCoe_p]$$

The analysis engine may be tailored depending on an end-user application. The analysis engine, for example, may use a different analysis method for one end-user application than another end-user application (e.g. linear regression vs polynomial regression). The analysis engine, for example, may use a different model (e.g. quadratic vs quintic, cubic vs 17th, 47th vs $1000^{th}$, etc) depending on the end-user application. The analysis engine may use a different amount of input variables for end-user application than another end-user application (e.g. 5 input variables vs 500 input variables). The analysis engine may have to fit more audited data for one end-user application than another end-user application.

The final color model values may be predicted by the color prediction engine using color parameters. The final color model values may be superimposed onto a target image. The color model values of the target image may be changed to the predicted final color model values. The final color model values may have the same pixel location as the subset of color model values of the first image. The final color model values may have different pixel location than the subset of color model value of the first image. In some cases, the final color model values may be reviewed by an auditor who may agree, decline, or adjust the color model values. In some cases, a range of color model values of the second image may be predicted. In some cases, an auditor/computer may review the ranges of color model values predicted.

The color prediction engine may receive and process an image for data. The color prediction engine may use a data extraction method to process the image data. The data extraction method may be used to parse data; data may be for example, the coordinates of each pixel of the image, the color model values of each pixel of the image, image file format, quantity of pixels of the image, metadata, image file size, dimensions of the image, or color model of the image, etc.

XR, layered image file format, Nrrd (Nearly raw raster data), PAM (Portable Arbitrary Map), PCX (Personal Computer eXchange), PGF (Progressive Graphics File), PLBM (Planar Bitmap), SGI, SID, Sun Raster, TGA (TARGA), VICAR (NASA/JPL image transport format), XISF (Extensible Image Serialization Format), AFPhoto (Affinity Photo Document), CD5 (Chasys Draw Image), CPT (Corel Photo Paint), PSD (Adobe PhotoShop Document), PSP (Corel Paint Shop Pro), XCF (eXperimental Computing Facility format), and PDN (Paint Dot Net). Such vector formats may be but not limited to: CGM (Computer Graphics Metafile), Gerber format (RS-274X), SVG (Scalable Vector Graphics), AFDesign (Affinity Designer document), AI (Adobe Illustrator Artwork), CDR (CorelDRAW), DrawingML, GEM metafiles, Graphics Layout Engine, HPGL, HVIF (Haiku Vector Icon Format), MathML, NAPLPS (North American Presentation Layer Protocol Syntax), ODG (OpenDocument Graphics), !DRAW, QCC, ReGIS, Remote imaging protocol, VML (Vector Markup Language), Xar format, XPS (XML Paper Specification), AMF (Additive Manufacturing File Format), Asymptote, .blend, COLLADA, .dgn, .dwf, .dwg, .dxf, eDrawings, .flt, FVRML, FX3D, HSF, IGES, IMML (Immersive Media Markup Language), IPA, JT, .MA (Maya ASCII format), .MB (Maya Binary format), .OBJ (Alias| Wavefront file format), OpenGEX (Open Game Engine Exchange), PLY, POV-Ray scene description language, PRC, STEP, SKP, STL (stereolithography format), U3D (Universal 3D file format), VRML (Virtual Reality Modeling Language), XAML, XGL, XVL, xVRML, X3D, 0.3D, 3DF, 0.3DM, 0.3ds, 3DXML, and X3D. In some cases, the digital image file format may be a compound format that uses both pixel and vector data.

In some cases, wavelets may be used to represent images. In some cases, wavelets may be used as a medium to receive data from an image. A wavelet may be decomposed using a biorthogonal wavelet filter bank with horizontal, vertical, and diagonal orientations or a pinwheel framelet with multiple orientations. In some cases, a pinwheel framelet may be, for example, a model of simple cells in the human visual cortex. A wavelet may be used to reconstruct an image by summing the subband signals. In some cases, a wavelet may be but not limited to a classical wavelet. In some cases, the decomposing of the wavelet may include a coefficient processing step. The coefficient processing step may be between a decomposition phase and a synthesis phase in the multiresolution decomposition. In some cases, decomposition detail coefficients may be normalized between the decomposition phase and the synthesis phase. In some cases, the multiresolution decomposition may be maximal overlap multiresolution decomposition, maximally decimated multiresolution decomposition, or partially decimated and partially overlapping multiresolution decomposition. In some cases, an image data may be edited and control may be performed such that the multiresolution decomposition may be performed on the edited image data, a ratio or difference between the reconstructed image data obtained from the edited image data and the image data that is unedited may be calculated as the amount of illusion and editing may be repeatedly performed such that the amount of illusion may be reduced. In some cases, editing may be repeatedly performed such that the amount of illusion may be given a numerical value. This may lead to an image with an arbitrary amount of illusion, such as an image with a large amount of illusion or an image with a small amount of illusion, may be created.

In some cases, the color prediction engine may use a color model. The color model may be the CIE XYZ color model. In some cases, the color model may be CIELAB color model. In some cases, the color model may be for example, a subtractive color model or additive color model. An additive color model may use red, green, and blue (RGB) values. A subtractive color model may use cyan, magenta, yellow, and black (CMYB). The color model may be a HSV color model that describes colors in hue, saturation, and value (HSV). The color model may be a HSL color model that describes colors in hue, saturation, and lightness (HSL). The color model may be a grayscale model where the pixel of a grayscale image has a brightness value ranging from 0 (black) to 255 (white). The color model may be converted into a different color model. More than one color model may be utilized.

The color prediction engine may have a variable amount of input variables depending on, for example, the end-user application, runtime, computer processing power, type of computer storage, amount of computer storage, thermal constraints due to computer processing, and other hardware-related parameters. Additionally, the amount of input variables may vary depending on the end applications, for example object position, shape, size, relative sizes, different sizes, different shapes, relative positions, location of objects within image, color sample size, color space, color profile, or proximity to other colors, etc. The color prediction engine may have at least 1, 2, 3, 4, 5, 6, 7, 8, 9, 10, 11, 12, 13, 14, 15, 20, 25, 30, 35, 40, 45, 50, 55, 60, 65, 70, 75, 80, 85, 90, 95, 100, 1000, 10000, 100000, 1000000, 10000000, 100000000, 1000000000, or more input variables. The color prediction engine may have at most 1000000000, 100000000, 10000000, 1000000, 100000, 10000, 1000, 100, 95, 90, 85, 80, 75, 70, 65, 60, 55, 50, 45, 40, 35, 30, 25, 20, 15, 14, 13, 12, 11, 10, 9, 8, 7, 6, 5, 4, 3, 2, or 1 input variables. The color prediction engine may have between 1 to 1000000000, 1 to 100000000, 1 to 10000000, 1 to 1000000, 1 to 100000, 1 to 10000, 1 to 1000, 1 to 100, 1 to 10, 1 to 5, 1 to 4, 1 to 3, 5 to 1000000000, 5 to 100000000, 5 to 10000000, 5 to 1000000, 5 to 100000, 5 to 10000, 5 to 1000, 5 to 100, 5 to 10, 5 to 9, 5 to 8, 5 to 7, 8 to 1000000000, 8 to 100000000, 8 to 10000000, 8 to 1000000, 8 to 100000, 8 to 10000, 8 to 1000, 8 to 100, 8 to 50, 8 to 40, 8 to 30, 8 to 20, 8 to 15, 8 to 12, 9 to 1000, 9 to 900, 9 to 800, 9 to 700, 9 to 600, 9 to 500, 9 to 400, 9 to 300, 9 to 200, 9 to 100, 9 to 90, 9 to 80, 9 to 70, 9 to 60, 9 to 50, 9 to 40, 9 to 30, 9 to 20, 9 to 18, 9 to 15, 9 to 13, 9 to 11 input variables.

The color prediction engine may use a general global model that describes all color model values using color parameters. In some cases, the color prediction engine may use a specific model that may be used for a specific end-user application. For example, a specific model may be used for cosmetics to predict color for makeup for different people. A general global model may include, for example:

$$Red = RedCoe_P * A^e * B^e * C^e * D^e * E^e * F^e * G^e * H^e * I^e + [\ldots]$$

$$Green = GreenCoe_P * A^e * B^e * C^e * D^e * E^e * F^e * G^e * H^e * + [\ldots]$$

$$Blue = BlueCoe_P * A^e * B^e * C^e * D^e * E^e * F^e * G^e * H^e * I^e + [\ldots]$$

where P is an increasing numerical value for each term in the polynomial and "e" is the exponent variable for each instance of A, B, C . . . [etc].

The color prediction engine may receive the color model values of 1 image, 2 images, 3 images, 5 images, 10 images, 100 images, 10000 images, 100000 images, 1000000 images or more. The smart model may receive the color model values of 1 to 1000000 images, 1 to 100000 images, 1 to 10000 images, 1 to 1000 images, 1 to 100 images, 1 to 10 images, or 1 to 5 images. The color prediction engine may generate new color model values on the target image. The new color model values on the target image may have the same pixel location as the color model values of the first image. The new color model values on the target image may have different pixel location than the color model values of the first image. The new color model values may be computer generated. The new color model values may be manually generated. The new color model values may be generated manually to match visually to the subset of an image by user as described elsewhere herein.

The color prediction engine may parse an image for data. Data may be for example, the coordinates of each pixel of the image, the color model values of each pixel of the image, image file format, quantity of pixels of the image, metadata, image file size, dimensions of the image, or color model of the image. Image processing performed by the color prediction engine model may be done, for example, using a general image processing algorithm, a specifically engineered image processing algorithm, or a Bayesian framework, etc.

The color prediction engine may receive an image such that the image retains the resolution before and after processing/receiving. In some cases, the color prediction model may process an image such that the resolution of the image may be different before and after processing. In some cases, resolution may refer to, for example, pixel resolution, spatial resolution, temporal resolution, or radiometric resolution. In some cases, the resolution may be in NTSC (national television system committee) format. In some cases, the resolution may be in PAL (phase alternating line) format. In some cases, the resolution may be in ATSC (advanced television systems committee) format. In some cases, the resolution may be in SECAM (séquentiel couleur à mémoire) format.

The color prediction engine may process an image of any pixel quantity and/or dimension. For example, an image may be described in terms of a width and height where a pixel may be a unit of measurement. The image may have a width of N pixels and a height of M pixels where in combination produce an image with N by M pixels and a total quantity of pixels of N×M, for example an image with 10 px by 15 px will have a total of 150 px. The width and/or height of the image may be at least about 1 pixel (px), 2 px, 3 px, 5 px, 7 px, 9 px, 10 px, 15 px, 20 px, 25 px, 30 px, 35 px, 40 px, 45 px, 50 px, 60 px, 70 px, 75 px, 80 px, 85 px, 90 px, 95 px, 100 px, 120 px, 140 px, 150 px, 170 px, 190 px, 200 px, 250 px, 300 px, 400 px, 500 px, 600 px, 700 px, 800 px, 900 px, 1000 px, 1200 px, 1400 px, 1600 px, 1800 px, 2000 px, 3000 px, 4000 px, 5000 px, 10000 px, 50000 px, 100000 px, 500000 px, 1000000 px, 5000000 px, 10000000 px, 50000000 px, 100000000 px, 1000000000 px, 10000000000 px, 100000000000 px or more. The width and/or height of the image may be at most about 100000000000 px, 10000000000 px, 1000000000 px, 100000000 px, 50000000 px, 10000000 px, 5000000 px, 1000000 px, 500000 px, 100000 px, 50000 px, 10000 px, 5000 px, 4000 px, 3000 px, 2000 px, 1800 px, 1600 px, 1400 px, 1200 px, 1000 px, 900 px, 800 px, 700 px, 600 px, 500 px, 400 px, 300 px, 250 px, 200 px, 190 px, 170 px, 150 px, 120 px, 100 px, 95 px, 90 px, 85 px, 80 px, 75 px, 70 px, 60 px, 50 px, 45 px, 40 px, 35 px, 30 px, 25 px, 20 px, 15 px, 10 px, 9 px, 8 px, 7 px, 5 px, 3 px, 2 px, or less. The width and/or height of the image may be from about 1 px to 100000000000 px, 1 px to 10000000000 px, 1 px to 1000000000 px, 1 px to 100000000 px, 1 px to 10000000 px, 1 px to 1000000 px, 1 px to 100000 px, 1 px to 10000 px, 1 px to 1000 px, 1 px to 100 px, 1 px to 50 px, 1 px to 25 px, 1 px to 15 px, 10 px to 100000000000 px, 10 px to 10000000000 px, 10 px to 1000000000 px, 10 px to 100000000 px, 10 px to 10000000 px, 10 px to 1000000 px, 10 px to 100000 px, 10 px to 10000 px, 10 px to 1000 px, 10 px to 100 px, 10 px to 50 px, 100 px to 100000000000 px, 100 px to 10000000000 px, 100 px to 1000000000 px, 100 px to 100000000 px, 100 px to 10000000 px, 100 px to 1000000 px, 100 px to 100000 px, 100 px to 10000 px, 100 px to 1000 px, 100 px to 500 px, 100 px to 100000000000 px, 100 px to 10000000000 px, 100 px to 1000000000 px, 1000 px to 100000000 px, 1000 px to 10000000 px, 1000 px to 1000000 px, 1000 px to 100000 px, 1000 px to 10000 px, 1000 px to 5000 px, 1000 px to 2000 px, 1000 px to 100000000000 px, 1000 px to 10000000000 px, 1000 px to 1000000000 px, 10000 px to 100000000 px, 10000 px to 10000000 px, 10000 px to 1000000 px, 10000 px to 100000 px, or 10000 px to 50000 px.

The image(s) received by the color prediction engine may be an arbitrary image representing, for example, a design, a photograph, cosmetic products, consumer goods, background drop, people, shapes, letters, computer generated images, biological and medical images, distorted or damaged images, etc. The image need not be a still image, but may be a moving image (video) in some instances.

The color prediction engine may receive the color model values of an entire image, a subset of an image, or a combination thereof. The subset of color model values may have different color model values than at least about 1%, 2%, 3%, 4%, 5%, 10%, 12%, 15%, 17%, 20%, 22%, 25%, 27%, 30%, 32%, 35%, 37%, 40%, 42%, 45%, 46%, 47%, 48%, 49%, 50%, 52%, 54%, 56%, 58%, 60%, 62%, 64%, 66%, 68%, 70%, 72%, 74%, 76%, 78%, 80%, 82%, 84%, 86%, 88%, 90%, 92%, 94%, 96%, 98%, 99% of the overall image. The subset of color model values may have different color model values than at most about 99%, 98%, 96%, 94%, 92%, 90%, 88%, 86%, 84%, 82%, 80%, 78%, 76%, 74%, 72%, 70%, 68%, 66%, 64%, 62%, 60%, 58%, 56%, 54%, 52%, 50%, 49%, 47%, 46% 45%, 42%, 40%, 37%, 35%, 32%, 30%, 27%, 25%, 22%, 20%, 17%, 15%, 12%, 10%, 7%, 5%, 4%, 3%, 2% or less of the overall image. The subset of color model values may have different color model values from about 1% to 99%, 1% to 98%, 1% to 96%, 1% to 94%, 1% to 92%, 1% to 90%, 1% to 88%, 1% to 86%, 1% to 84%, 1% to 82%, 1% to 80%, 1% to 78%, 1% to 76%, 1% to 74%, 1% to 72%, 1% to 70%, 1% to 68%, 1% to 66%, 1% to 64%, 1% to 62%, 1% to 60%, 1% to 58%, 1% to 56%, 1% to 54%, 1% to 52%, 1% to 50%, 1% to 49%, 1% to 45%, 1% to 40%, 1% to 35%, 1% to 30%, 1% to 25%, 1% to 20%, 1% to 15%, 1% to 10%, 1% to 5%, 1% to 3%, 5% to 99%, 5% to 98%, 5% to 96%, 5% to 94%, 5% to 92%, 5% to 90%, 5% to 88%, 5% to 86%, 5% to 84%, 5% to 82%, 5% to 80%, 5% to 78%, 5% to 76%, 5% to 74%, 5% to 72%, 5% to 70%, 5% to 68%, 5% to 66%, 5% to 64%, 5% to 62%, 5% to 60%, 5% to 58%, 5% to 56%, 5% to 54%, 5% to 52%, 5% to 50%, 5% to 49%, 5% to 45%, 5% to 40%, 5% to 35%, 5% to 30%, 5% to 25%, 5% to 20%, 5% to 55%, 5% to 50%, 10% to 99%, 10% to 98%, 10% to 96%, 10% to 94%, 10% to 92%, 10% to 90%, 10% to 88%, 10% to 86%, 10% to 84%, 10% to 82%, 10% to 80%, 10% to 78%, 10% to 76%, 10% to 74%, 10% to 72%, 10% to 70%, 10% to 68%, 10% to 66%, 10% to 64%, 10% to 62%, 10% to 60%, 10% to 58%, 10% to 56%, 10% to 54%, 10% to 52%, 10% to 50%, 10% to 49%, 10% to 45%, 10% to 40%, 10% to 35%, 10% to 30%, 10% to 25%, 10% to 20%, 10% to 15%, 20% to 49%, 20% to 45%, 20% to 40%, 20% to 35%, 20% to 30%, 20% to 25%, 30% to 49%, 30% to 45%, 30% to 40%, or 30% to 35% of the overall image.

The visual color perception between images (e.g. a target image and input image) may be such that the images appear substantially similar to one another and/or may be indistinguishable to an end-user. The visual color perception may be dependent on the color model values (e.g. RGB color model values) of the images. The visual color perception may be dependent on the color model values of the objects in the images (e.g. shapes, sizes, dimensions, positions, proximity between objects, etc.). The visual color perception may be a color ratio (e.g., RGB color values) between a target image and an input image.

In some cases, the visual color perception of the target image and input image may have RGB values that are each at least within about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, or 99% from each other. For example, the RGB color model values for the target image's target foreground color and target background color may have a red color model values from 10%, green color model values from 5%, and blue color model values 1% relative to the RGB color model values of the first foreground object and the first background color of the input image. In some cases, the visual color perception of the target image and input image may have RGB values that are each at most within about 99%, 98%, 97%, 96%, 95%, 94%, 93%, 92%, 91%, 90%, 89%, 88%, 87%, 86%, 85%, 84%, 83%, 82%, 81%, 80%, 79%, 78%, 77%, 76%, 75%, 74%, 73%, 72%, 71%, 70%, 69%, 68%, 67%, 66%, 65%, 64%, 63%, 62%, 61%, 60%, 59%, 58%, 57%, 56%, 55%, 54%, 53%, 52%, 51%, 50%, 49%, 48%, 47%, 46%, 45%, 44%, 43%, 42%, 41%, 40%, 39%, 38%, 37%, 36%, 35%, 34%, 33%, 32%, 31%, 30%, 29%, 28%, 27%, 26%, 25%, 24%, 23%, 22%, 21%, 20%, 19% 18%, 17%, 16%, 15%, 14%, 13%, 12%, 11%, 10%, 9%, 8%, 7%, 6%, 5%, 4%, 3%, 2% or 1% from each other. For example, the RGB color model values for the target image's target foreground color and target background color may have a red color model values from 1%, green color model values from 5%, and blue color model values 10% relative to the RGB color model values of the first foreground object and the first background color of the input image. In some cases, the visual color perception of the target image and input image may have RGB values that are each within from about 1% to 99%, 1% to 98%, 1% to 97%, 1% to 96%, 1% to 95%, 1% to 94%, 1% to 93%, 1% to 92%, 1% to 91%, 1% to 90%, 1% to 89%, 1% to 88%, 1% to 87%, 1% to 86%, 1% to 85%, 1% to 84%, 1% to 83%, 1% to 82%, 1% to 81%, 1% to 80%, 1% to 79%, 1% to 78%, 1% to 77%, 1% to 76%, 1% to 75%, 1% to 74%, 1% to 73%, 1% to 72%, 1% to 71%, 1% to 70%, 1% to 69%, 1% to 68%, 1% to 67%, 1% to 66%, 1% to 65%, 1% to 64%, 1% to 63%, 1% to 62%, 1% to 61%, 1% to 60%, 1% to 59%, 1% to 58%, 1% to 57%, 1% to 56%, 1% to 55%, 1% to 54%, 1% to 53%, 1% to 52%, 1% to 51%, 1% to 50%, 1% to 49%, 1% to 48%, 1% to 47%, 1% to 46%, 1% to 45%, 1% to 44%, 1% to 43%, 1% to 42%, 1% to 41%, 1% to 40%, 1% to 39%, 1% to 38%, 1% to 37%, 1% to 36%, 1% to 35%, 1% to 34%, 1% to 33%, 1% to 32%, 1% to 31%, 1% to 30%, 1% to 29%, 1% to 28%, 1% to 27%, 1% to 26%, 1% to 25%, 1% to 24%, 1% to 23%, 1% to 22%, 1% to 21%, 1% to 20%, 1% to 19%, 1% to 18%, 1% to 17%, 1% to 16%, 1% to 15%, 1% to 14%, 1% to 13%, 1% to 12%, 1% to 11%, 1% to 10%, 1% to 9%, 1% to 8%, 1% to 7%, 1% to 6%, 1% to 5%, 1% to 4%, 1% to 3%, 1% to 2%, 5% to 99%, 5% to 98%, 5% to 97%, 5% to 96%, 5% to 95%, 5% to 94%, 5% to 93%, 5% to 92%, 5% to 91%, 5% to 90%, 5% to 89%, 5% to 88%, 5% to 87%, 5% to 86%, 5% to 85%, 5% to 84%, 5% to 83%, 5% to 82%, 5% to 81%, 5% to 80%, 5% to 79%, 5% to 78%, 5% to 77%, 5% to 76%, 5% to 75%, 5% to 74%, 5% to 73%, 5% to 72%, 5% to 71%, 5% to 70%, 5% to 69%, 5% to 68%, 5% to 67%, 5% to 66%, 5% to 65%, 5% to 64%, 5% to 63%, 5% to 62%, 5% to 61%, 5% to 60%, 5% to 59%, 5% to 58%, 5% to 57%, 5% to 56%, 5% to 55%, 5% to 54%, 5% to 53%, 5% to 52%, 5% to 51%, 5% to 50%, 5% to 49%, 5% to 48%, 5% to 47%, 5% to 46%, 5% to 45%, 5% to 44%, 5% to 43%, 5% to 42%, 5% to 41%, 5% to 40%, 5% to 39%, 5% to 38%, 5% to 37%, 5% to 36%, 5% to 35%, 5% to 34%, 5% to 33%, 5% to 32%, 5% to 31%, 5% to 30%, 5% to 29%, 5% to 28%, 5% to 27%, 5% to 26%, 5% to 25%, 5% to 24%, 5% to 23%, 5% to 22%, 5% to 21%, 5% to 20%, 5% to 19%, 5% to 18%, 5% to 17%, 5% to 16%, 5% to 15%, 5% to 14%, 5% to 13%, 5% to 12%, 5% to 11%, 5% to 10%, 5% to 9%, 5% to 8%, 5% to 7%, 5% to 6%, 10% to 99%, 10% to 98%, 10% to 97%, 10% to 96%, 10% to 95%, 10% to 94%, 10% to 93%, 10% to 92%, 10% to 91%, 10% to 90%, 10% to 89%, 10% to 88%, 10% to 87%, 10% to 86%, 10% to 85%, 10% to 84%, 10% to 83%, 10% to 82%, 10% to 81%, 10% to 80%, 10% to 79%, 10% to 78%, 10% to 77%, 10% to 76%, 10% to 75%, 10% to 74%, 10% to 73%, 10% to 72%, 10% to 71%, 10% to 70%, 10% to 69%, 10% to 68%, 10% to 67%, 10% to 66%, 10% to 65%, 10% to 64%, 10% to 63%, 10% to 62%, 10% to 61%, 10% to 60%, 10% to 59%, 10% to 58%, 10% to 57%, 10% to 56%, 10% to 55%, 10% to 54%, 10% to 53%, 10% to 52%, 10% to 51%, 10% to 50%, 10% to 49%, 10% to 48%, 10% to 47%, 10% to 46%, 10% to 45%, 10% to 44%, 10% to 43%, 10% to 42%, 10% to 41%, 10% to 40%, 10% to 39%, 10% to 38%, 10% to 37%, 10% to 36%, 10% to 35%, 10% to 34%, 10% to 33%, 10% to 32%, 10% to 31%, 10% to 30%, 10% to 29%, 10% to 28%, 10% to 27%, 10% to 26%, 10% to 25%, 10% to 24%, 10% to 23%, 10% to 22%, 10% to 21%, 10% to 20%, 10% to 19%, 10% to 18%, 10% to 17%, 10% to 16%, 10% to 15%, 10% to 14%, 10% to 13%, 10% to 12%, 10% to 11%, 20% to 99%, 20% to 98%, 20% to 97%, 20% to 96%, 20% to 95%, 20% to 94%, 20% to 93%, 20% to 92%, 20% to 91%, 20% to 90%, 20% to 89%, 20% to 88%, 20% to 87%, 20% to 86%, 20% to 85%, 20% to 84%, 20% to 83%, 20% to 82%, 20% to 81%, 20% to 80%, 20% to 79%, 20% to 78%, 20% to 77%, 20% to 76%, 20% to 75%, 20% to 74%, 20% to 73%, 20% to 72%, 20% to 71%, 20% to 70%, 20% to 69%, 20% to 68%, 20% to 67%, 20% to 66%, 20% to 65%, 20% to 64%, 20% to 63%, 20% to 62%, 20% to 61%, 20% to 60%, 20% to 59%, 20% to 58%, 20% to 57%, 20% to 56%, 20% to 55%, 20% to 54%, 20% to 53%, 20% to 52%, 20% to 51%, 20% to 50%, 20% to 49%, 20% to 48%, 20% to 47%, 20% to 46%, 20% to 45%, 20% to 44%, 20% to 43%, 20% to 42%, 20% to 41%, 20% to 40%, 20% to 39%, 20% to 38%, 20% to 37%, 20% to 36%, 20% to 35%, 20% to 34%, 20% to 33%, 20% to 32%, 20% to 31%, 20% to 30%, 20% to 29%, 20% to 28%, 20% to 27%, 20% to 26%, 20% to 25%, 20% to 24%, 20% to 23%, 20% to 22%, 20% to 21%, 30% to 99%, 30% to 98%, 30% to 97%, 30% to 96%, 30% to 95%, 30% to 94%, 30% to 93%, 30% to 92%, 30% to 91%, 30% to 90%, 30% to 89%, 30% to 88%, 30% to 87%, 30% to 86%, 30% to 85%, 30% to 84%, 30% to 83%, 30% to 82%, 30% to 81%, 30% to 80%, 30% to 79%, 30% to 78%, 30% to 77%, 30% to 76%, 30% to 75%, 30% to 74%, 30% to 73%, 30% to 72%, 30% to 71%, 30% to 70%, 30% to 69%, 30% to 68%, 30% to 67%, 30% to 66%, 30% to 65%, 30% to 64%, 30% to 63%, 30% to 62%, 30% to 61%, 30% to 60%, 30% to 59%, 30% to 58%, 30% to 57%, 30% to 56%, 30% to 55%, 30% to 54%, 30% to 53%, 30% to 52%, 30% to 51%, 30% to 50%, 30% to 49%, 30% to 48%, 30% to 47%, 30% to 46%, 30% to 45%, 30% to 44%, 30% to 43%, 30% to 42%, 30% to 41%, 30% to 40%, 30% to 39%, 30% to 38%, 30% to 37%, 30% to 36%, 30% to 35%, 30% to 34%, 30% to 33%, 30% to 32%, 30% to 31%, 50% to 99%, 50% to 98%, 50% to 97%, 50% to 96%, 50% to 95%, 50% to 94%, 50% to 93%, 50% to 92%, 50% to 91%, 50% to 90%, 50% to 89%, 50% to 88%, 50% to 87%, 50% to 86%, 50% to 85%, 50% to 84%, 50% to 83%, 50% to 82%, 50% to 81%, 50% to 80%, 50% to 79%, 50% to 78%, 50% to 77%, 50% to 76%, 50% to 75%, 50% to 74%, 50% to 73%, 50% to 72%, 50% to 71%, 50% to 70%, 50% to 69%, 50% to 68%, 50% to 67%, 50% to 66%, 50% to 65%, 50% to 64%, 50% to 63%, 50% to 62%, 50% to 61%, 50% to 60%, 50% to 59%, 50% to 58%, 50% to 57%, 50% to 56%, 50% to 55%, 50% to 54%, 50% to 53%, 50% to 52%, or 50% to 51% of each other. For example, the RGB color model values for the target image's target foreground color and target background color may have a red color model values from 1% to 98%, green color model values from 10% to 91%, and blue color model values 5% to 91% relative to the RGB color model values of the first foreground object and the first background color of the input image.

In some cases, the engines (smart engine, analysis engine, and/or color prediction engine) may be combined into one another. For example, the smart engine and analysis engine may be combined into a single engine; the analysis engine and color prediction engine may be combined into a single engine; the smart engine and color prediction engine may be combined into a single engine; the smart engine, analysis engine, and color prediction engine may be combined into a single engine. In some cases, at least 1, 2, 3, 4, 5, 10, 15, 20, 25, 30, 35, 40, 45, 50, 60, 70, 80, 90, 100, 150, 200, 250, 300, 350, 400, 450, 500, 550, 600, 650, 700, 750, 800, 850, 900, 950, 1000, 2000, 5000, 10000, 1000000, or more smart engines may be used. In some cases, at most 1000000, 10000, 5000, 2000, 1000, 950, 900, 850, 800, 750, 700, 650, 600, 550, 500, 450, 400, 350, 300, 250, 200, 150, 100, 90, 80, 70, 60, 50, 40, 30, 20, 10, 5, 3, 2 or less smart engines may be used. In some cases, 1 to 1000000, 1 to 10000, 1 to 5000, 1 to 2000, 1 to 1000, 1 to 950, 1 to 900, 1 to 850, 1 to 800, 1 to 750, 1 to 700, 1 to 650, 1 to 600, 1 to 550, 1 to 450, 1 to 400, 1 to 350, 1 to 300, 1 to 250, 1 to 200, 1 to 150, 1 to 100, 1 to 90, 1 to 80, 1 to 70, 1 to 60, 1 to 50, 1 to 40, 1 to 30, 1 to 20, 1 to 10, 1 to 5, or 1 to 3 smart engines.

In some cases, at least 1, 2, 3, 4, 5, 10, 15, 20, 25, 30, 35, 40, 45, 50, 60, 70, 80, 90, 100, 150, 200, 250, 300, 350, 400, 450, 500, 550, 600, 650, 700, 750, 800, 850, 900, 950, 1000, 2000, 5000, 10000, 1000000, or more analysis engines may be used. In some cases, at most 1000000, 10000, 5000, 2000, 1000, 950, 900, 850, 800, 750, 700, 650, 600, 550, 500, 450, 400, 350, 300, 250, 200, 150, 100, 90, 80, 70, 60, 50, 40, 30, 20, 10, 5, 3, 2 or less analysis engines may be used. In some cases, 1 to 1000000, 1 to 10000, 1 to 5000, 1 to 2000, 1 to 1000, 1 to 950, 1 to 900, 1 to 850, 1 to 800, 1 to 750, 1 to 700, 1 to 650, 1 to 600, 1 to 550, 1 to 450, 1 to 400, 1 to 350, 1 to 300, 1 to 250, 1 to 200, 1 to 150, 1 to 100, 1 to 90, 1 to 80, 1 to 70, 1 to 60, 1 to 50, 1 to 40, 1 to 30, 1 to 20, 1 to 10, 1 to 5, or 1 to 3 analysis engines. In some cases, at least 1, 2, 3, 4, 5, 10, 15, 20, 25, 30, 35, 40, 45, 50, 60, 70, 80, 90, 100, 150, 200, 250, 300, 350, 400, 450, 500, 550, 600, 650, 700, 750, 800, 850, 900, 950, 1000, 2000, 5000, 10000, 1000000, or more color prediction engines may be used. In some cases, at most 1000000, 10000, 5000, 2000, 1000, 950, 900, 850, 800, 750, 700, 650, 600, 550, 500, 450, 400, 350, 300, 250, 200, 150, 100, 90, 80, 70, 60, 50, 40, 30, 20, 10, 5, 3, 2 or less color prediction engines may be used. In some cases, 1 to 1000000, 1 to 10000, 1 to 5000, 1 to 2000, 1 to 1000, 1 to 950, 1 to 900, 1 to 850, 1 to 800, 1 to 750, 1 to 700, 1 to 650, 1 to 600, 1 to 550, 1 to 450, 1 to 400, 1 to 350, 1 to 300, 1 to 250, 1 to 200, 1 to 150, 1 to 100, 1 to 90, 1 to 80, 1 to 70, 1 to 60, 1 to 50, 1 to 40, 1 to 30, 1 to 20, 1 to 10, 1 to 5, or 1 to 3 color prediction engines.

The color prediction engine may be tailored for a specific end-user application. The color prediction engine, for example, may require more input variables depending on the end-user application. In some cases, the color model of the end-user application may be the CIE XYZ color model, CIELAB color model, RGB color model, CMYB color model, HSV color model, HSL color model, or grayscale model, etc. The color prediction engine may utilize a different color prediction model depending on the end-user application.

The color prediction application may be used for a variety of different end-user applications. The end-user applications may be, for example, ascertaining colors for online shopping, film applications, photo applications, paint applications, augmented reality, virtual reality, electronic displays, computer vision, or robotics, etc.

In an alternative aspect, the methods and systems described herein may be used to predict the background color model values instead of the foreground color model values of an image.

In an alternative aspect, a computer-implemented method for predicting an optimal color, the method comprising; receiving color model values of an input image; receiving color model values of a target image; producing color parameters from the color model values of the image, the color model values of the target image, and a smart engine; wherein the smart engine, comprising; receiving color model values of an image; receiving color model values of a target image; generating new color model values on the target image; auditing the new color model values; updating the smart engine; and predicting final color model values based on the color parameters for an end-user application.

In FIG. 1 shows a color prediction application 100 that may be used for a variety of different end-user applications. The methods and systems for the color prediction application 100 may be tailored for any end-user application. The end-user applications may be, for example, film applications 150, photo applications 155, online shopping 160 (clothes shopping, cosmetics, etc) augmented reality 165, virtual reality 170, computer vision 175, robotics 180, or consumer goods, etc. The end-user may be, for example, a person and/or group of people, a computer system, or an animal, etc.

Figure 2:
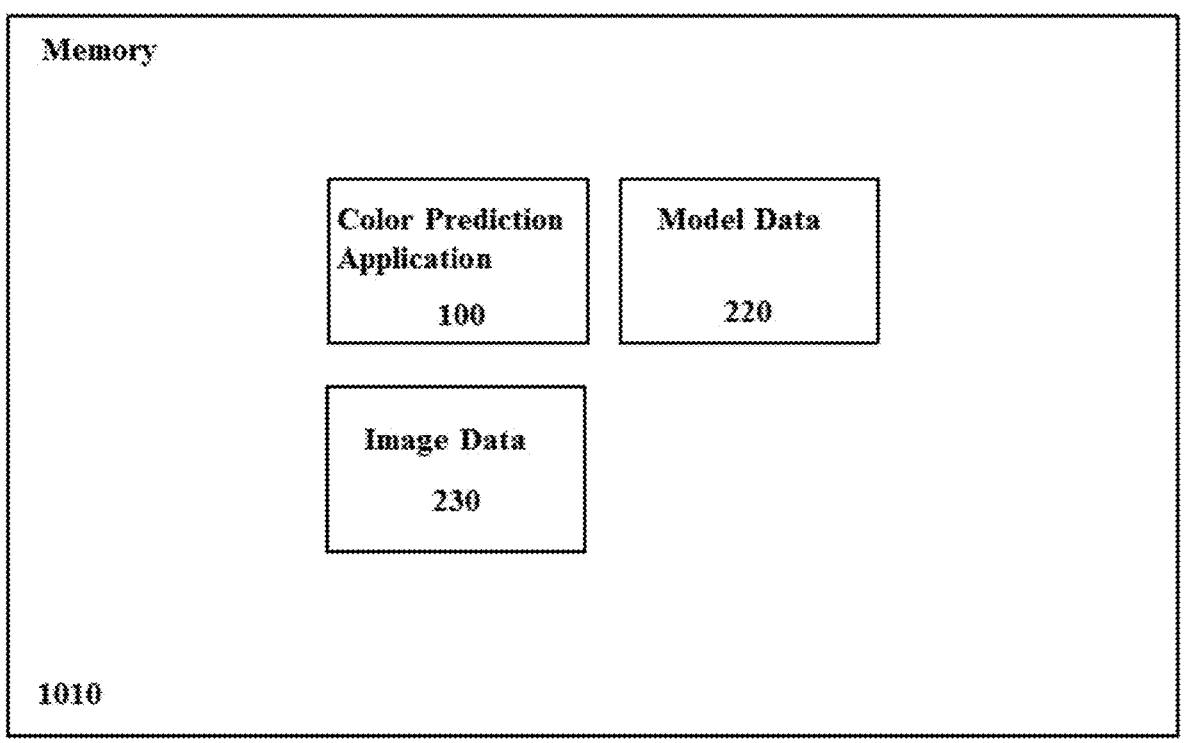
FIG. 2 shows a color predictor application and color/model data within memory, in accordance with embodiments of the present disclosure.

In FIG. 2 shows a color prediction application 100 along with image data 230 and model data 220 within memory 1010.

Figure 3:
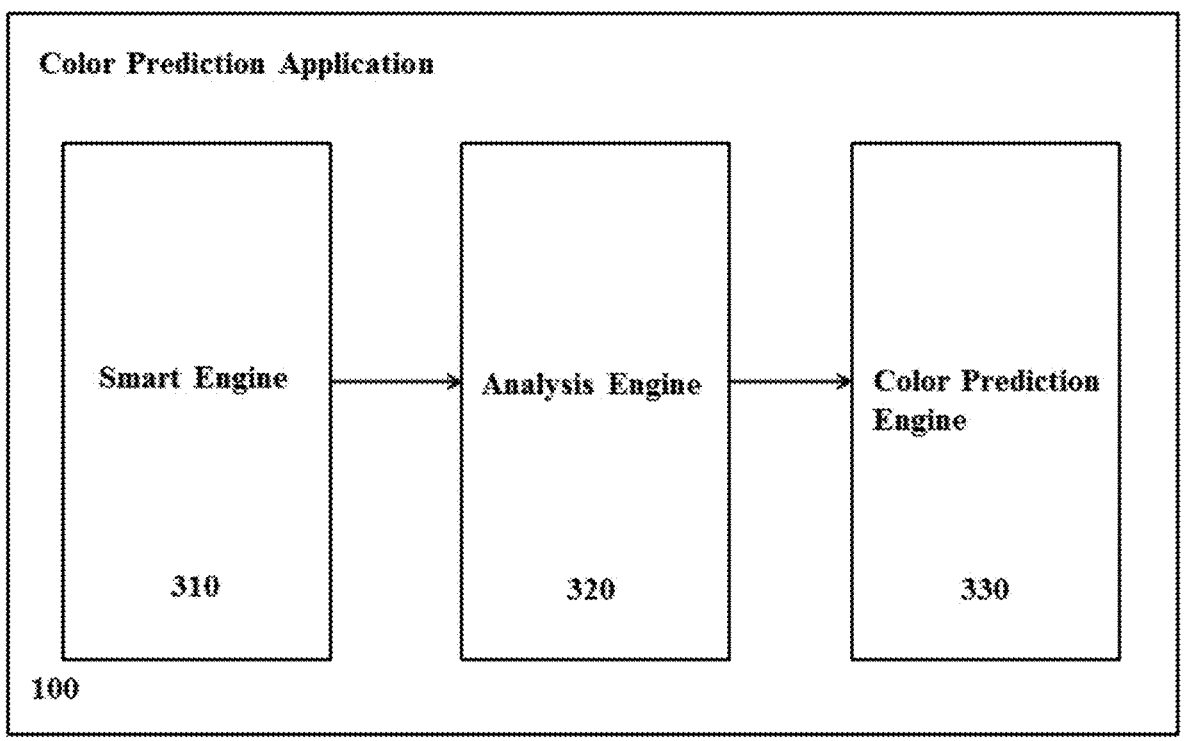
FIG. 3 shows a color predictor application that provides for modeling and prediction of color model values, in accordance with embodiments of the present disclosure.

In FIG. 3, shows a flowchart of the components of the color prediction application 100. The color prediction application 100 may comprise a smart engine 310, analysis engine 320, and color prediction engine 330. Each engine may feed data (e.g. color model values, pixel coordinates, etc.) from one to another. In some cases, not all engines are required. In some cases, one engine may feed data into another engine (e.g. smart engine to color prediction engine, analysis engine to smart engine, or color prediction engine to smart engine, etc). In some cases, the engines may be combined. In some cases, the smart engine, analysis engine, and/or color prediction engine may be tailored for a specific color prediction end-user application.

Figure 4:
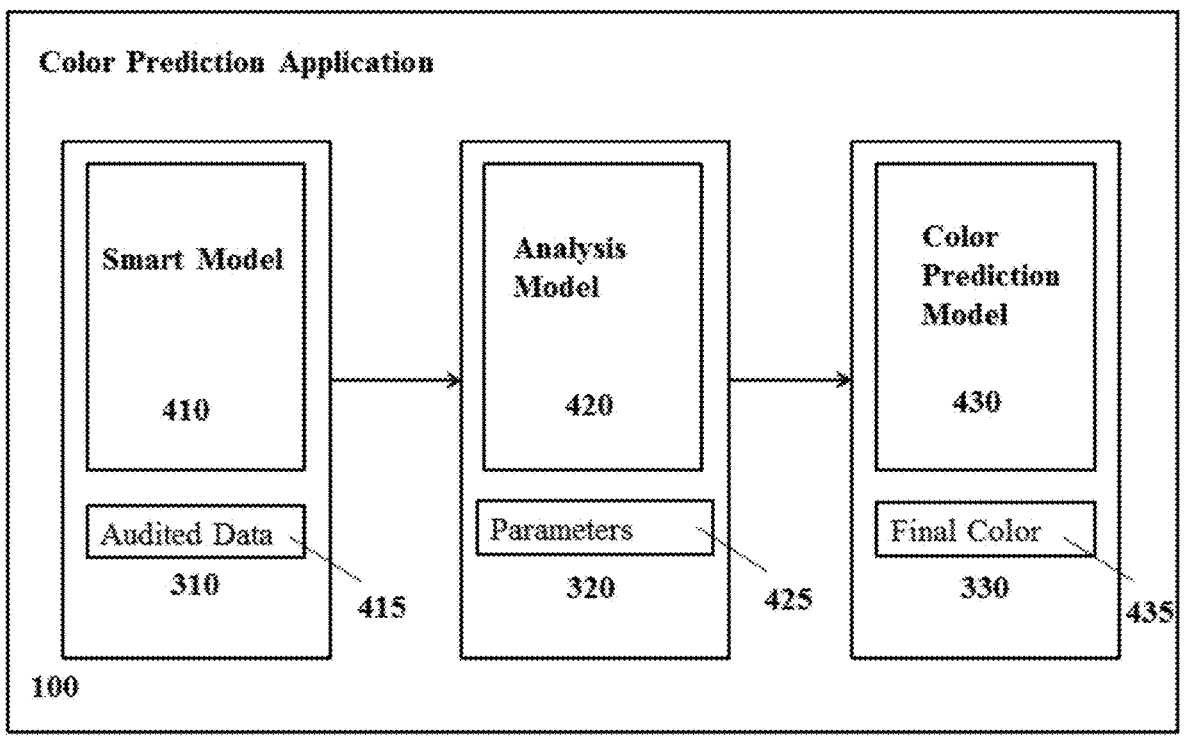
FIG. 4 shows a smart engine, analysis engine, and color prediction engine of the color prediction application, in accordance with embodiments of the present disclosure.

In FIG. 4, shows the smart model 410, analysis model 420, and color prediction model 430 with their respective engines. The smart model 410 outputs audited data 415 that the smart engine 310 transfers to the analysis engine 320. The analysis model 420 utilizes the audited data 415 to produce parameters 425 that are fed into the color prediction engine 330. The color prediction model 430 utilizes the parameters 425 from the analysis engine 320 to produce a final color 435 for the target image.

Figure 5:
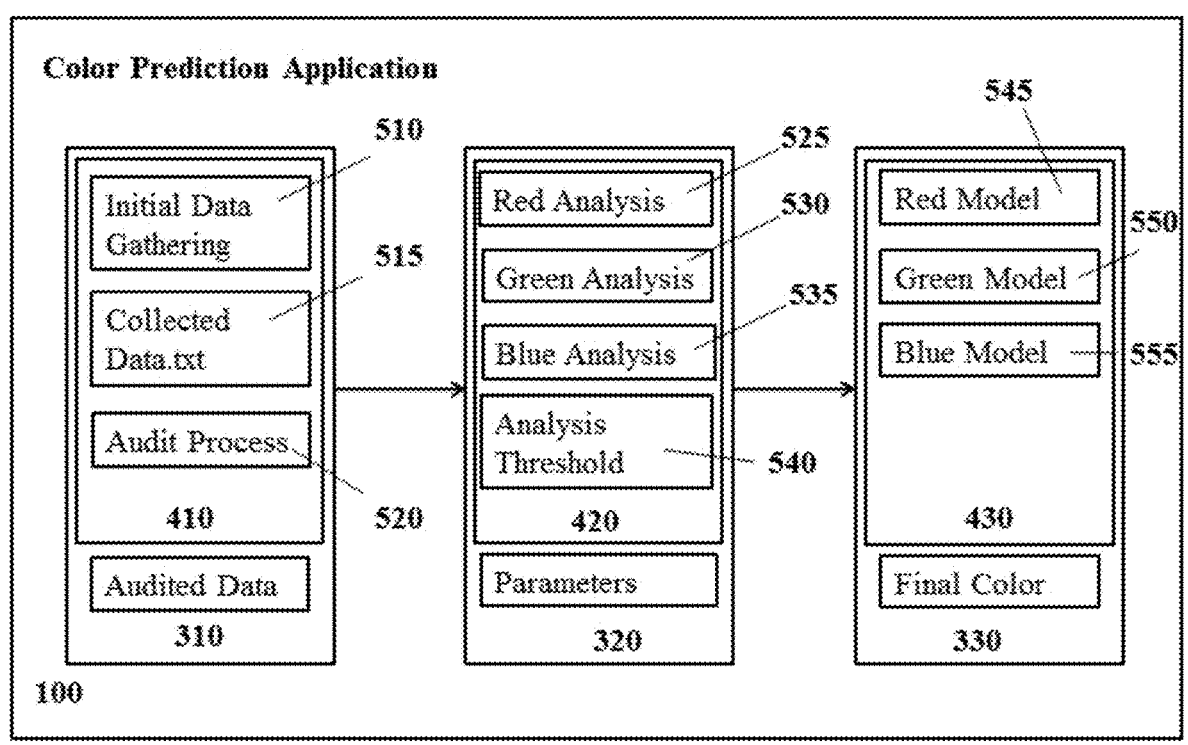
FIG. 5 shows a smart model, analysis model, and color prediction model of the color prediction application, in accordance with embodiments of the present disclosure.

In FIG. 5, the smart model 410 may comprise an initial data gathering step 510 where the data collected may be stored into a text file 515. The stored data may be processed by an audit process 520 which may be audited, for example, by a person/people or by a machine learning algorithm. The audited data 415 may be transferred and analyzed accordingly by the color model values via a red analysis 525, green analysis 530, and blue analysis 535 method(s). Each analysis may pass parameters 320 to the smart engine 330 after an analysis threshold 540 may be met (e.g. good data fit). The red model 545, green model 550, and blue model 555, may utilize the parameters to produce a final color 435 for the target image.

Figure 6A:
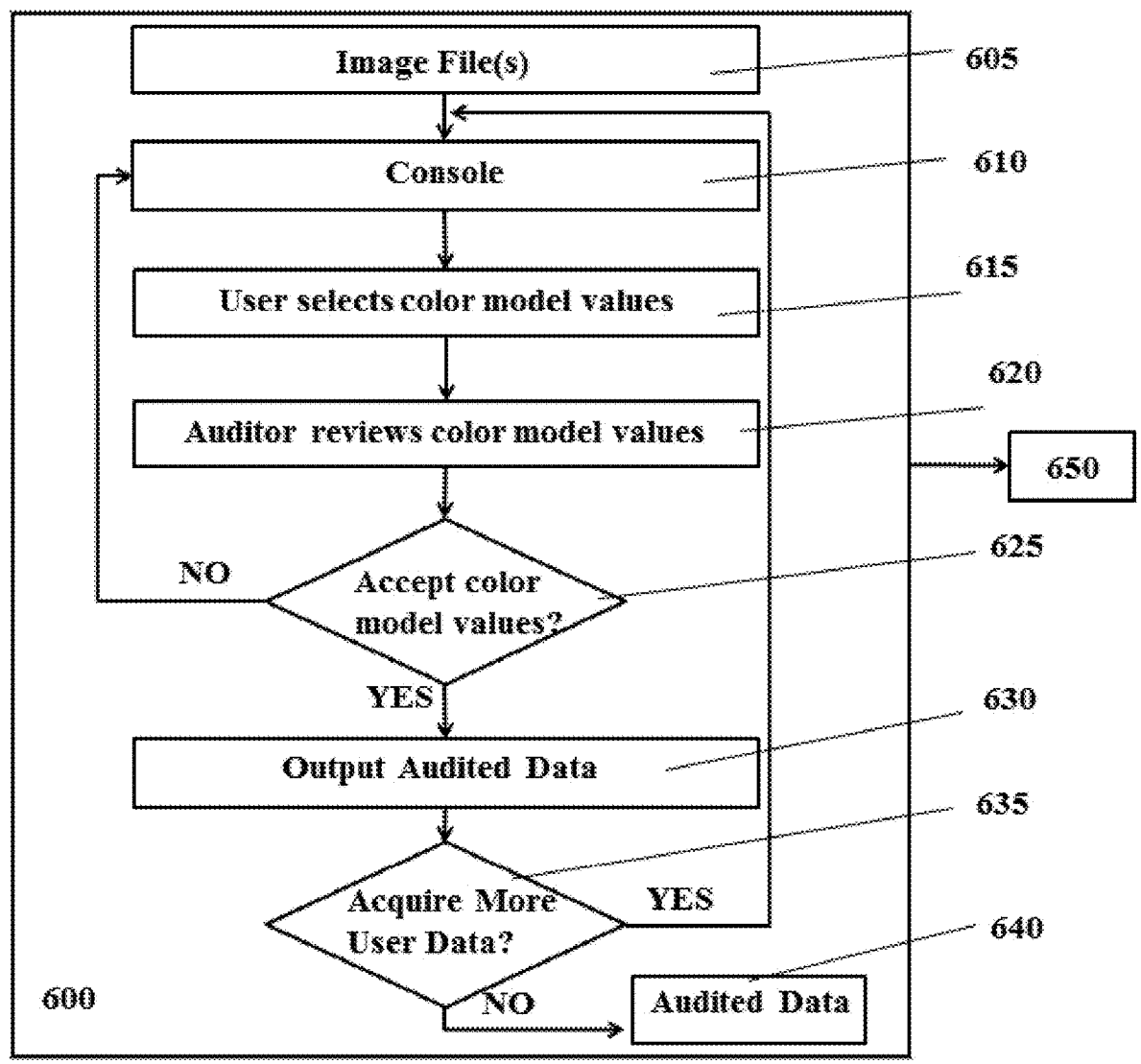
FIG. 6A conceptually illustrates the principal steps for collecting user input and auditing user input of image(s) for color prediction, in accordance with embodiments of the present disclosure.

In FIG. 6A, a flowchart illustrates the principal steps for collecting user input and auditing user input of image(s) for color prediction. A console 610 may be provided where the user may be presented with an image with a background color and a foreground color, as well as a separate image with a second background color and a second foreground color. The images and color model values of the console may be computer generated or externally collected images (images obtained through a medium, for example, photo-camera, video-camera, smartphone-camera, or drawing, etc.). The user then selects and adjusts the color model values 615 of the second foreground color until the user believes they have visually matched the color of the first foreground color so that they have the same visual color perception (indistinguishable from one another) and substantially similar to an end-user. The color model values are then stored and reviewed by an auditor 620. The auditor then reviews the color model values selected by the user and agrees, declines, or changes the color model values 625. These steps are repeated with a variety of different color combinations from a variety of different users until the auditor has determined adequate data has been obtained 635. Once the auditor has decided adequate data has been audited, the audited data may be passed to the analysis model for data fitting.

Figure 6B:
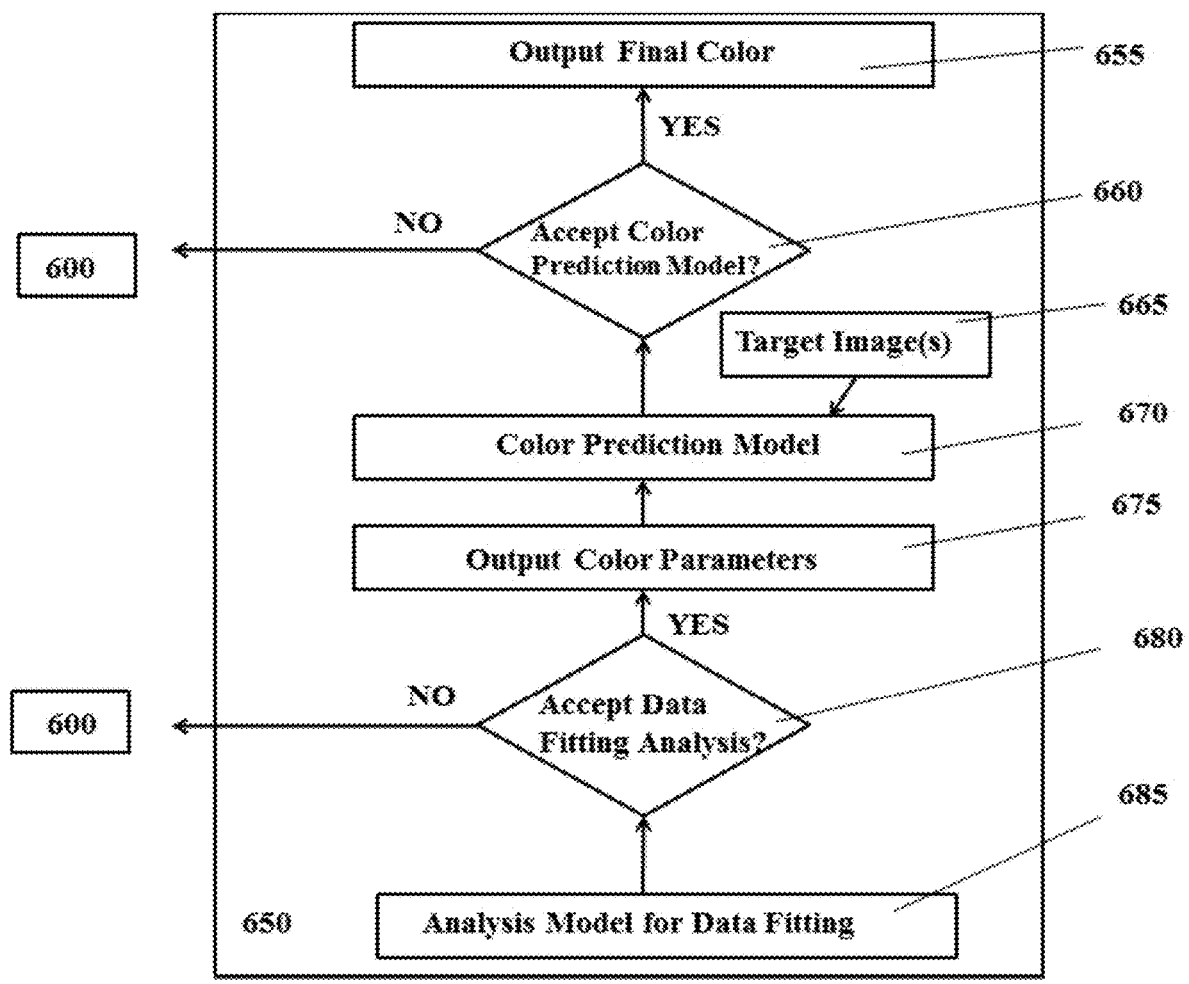
FIG. 6B conceptually illustrates the principal steps for analysis of image data for the output of a final color, in accordance with embodiments of the present disclosure.

In FIG. 6B, a flowchart illustrates the principal steps for analysis of image data for the output of a final color for a target image. The analysis model 685 may use the audited data to generate parameters 675 (e.g. coefficients, weights) for the color prediction model 670. The analysis model may use a RGB model that describes the RGB values of the first foreground square, first background, second background, and second foreground square and a least squares analysis function to determine the quality of color model values 680 (e.g. whether more color model values are needed to determine an accurate visual color perception for the color model values). In conjunction with the color parameters 675, the color prediction model 670 may take a target image(s) 665 that may have a background color and a foreground color as well as a separate image with a second background color. The auditor may decide whether the color prediction model output is appropriate 660 and output a final color 655.

Figure 7:
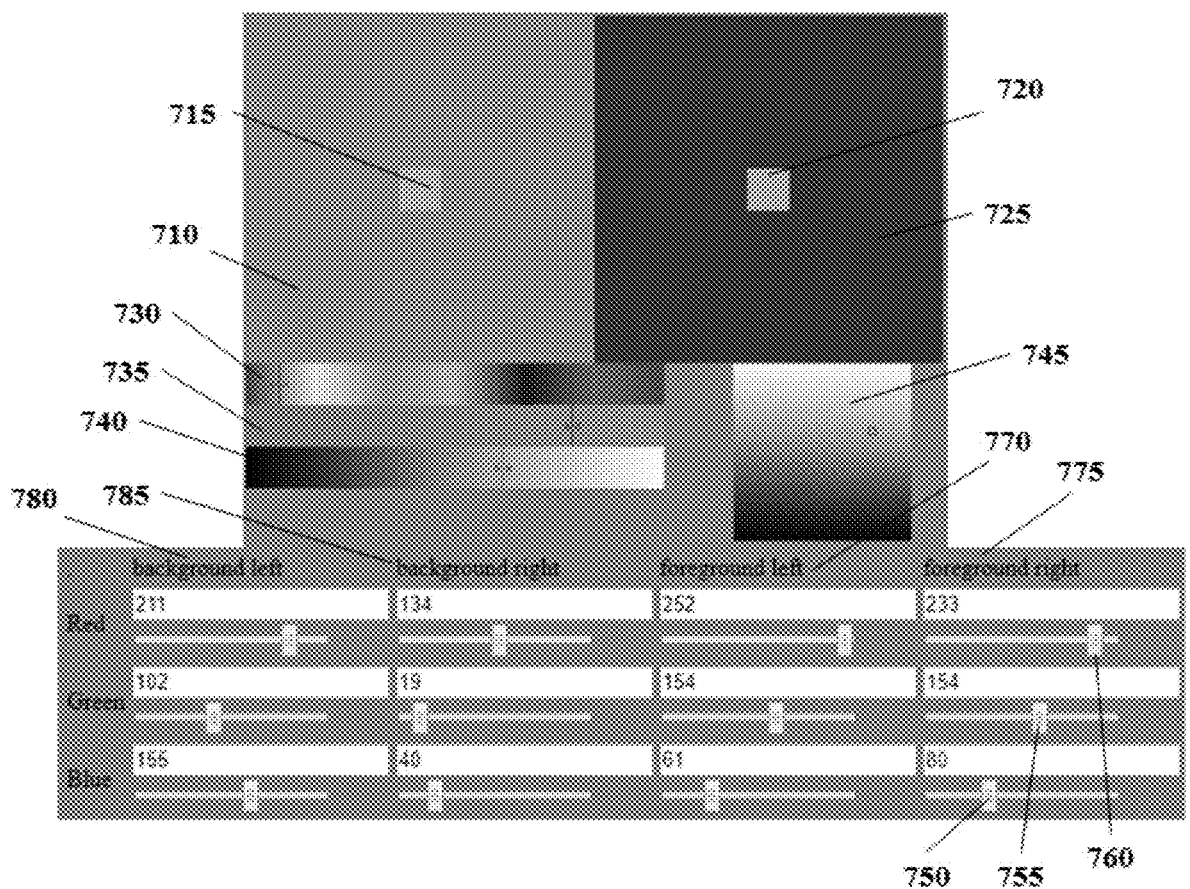
FIG. 7 illustrates an example of auditing colors in accordance with embodiments of the present disclosure.

In FIG. 7, shows a console that displays an image with a left background color 710, a left foreground color 715, a right (target) background color 725, and a right (target) foreground color 720. The user may adjust the foreground right color 720 using a color slider that can adjust the RGB values separately (e.g. adjust the red color values using the red color slider 760, green color values using the green color slider 755, and/or blue color values using the blue color slider 750). The RGB values may range from 0 to 255 for each individual color model value. The color model values for the left background 780, background right 785, foreground left 770, and foreground right 775 are all shown on the console. A hue bar 730, saturation bar 735, a lightness bar 740, and saturation-lightness color field 745 are also shown on the console.

Figure 8:
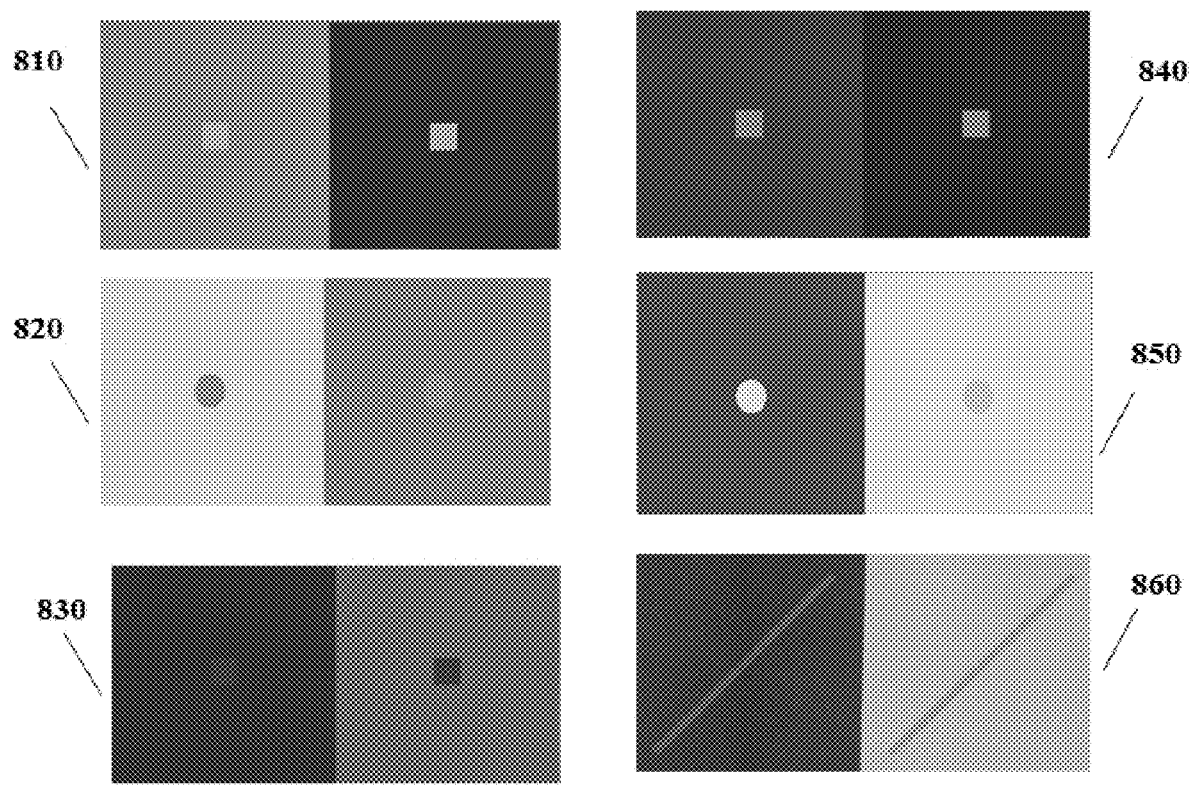
FIG. 8 illustrates multiple examples of auditing colors for different shapes in accordance with embodiments of the present disclosure.

In FIG. 8, shows various examples of user input for training the image system. The examples show various colors, shapes, and sizes.

Figure 9:
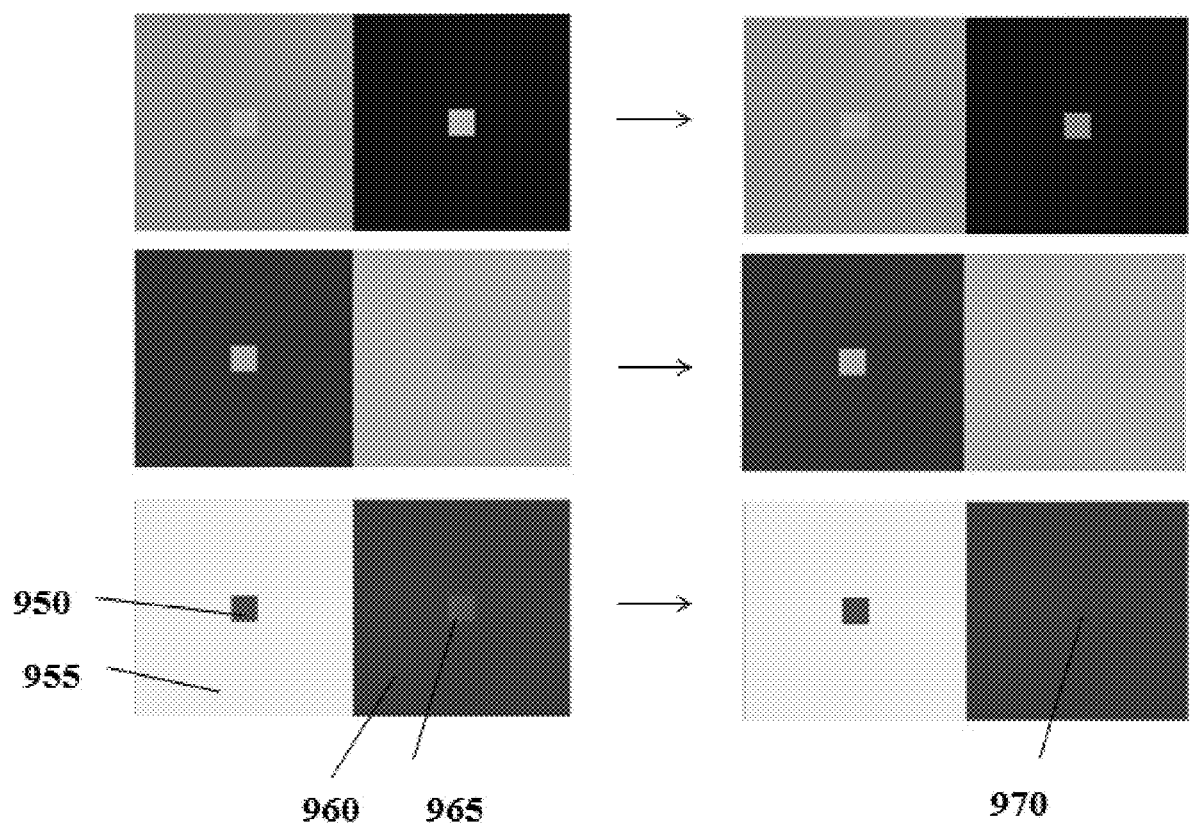
FIG. 9 illustrates multiple examples of color prediction in accordance with embodiments of the present disclosure.

In FIG. 9, shows multiple before and after final predicted color model values produced by the color prediction application. The color prediction application receives an image with color model values for a first foreground object 950, a first background 955, a target background 960, and a target foreground color 965 and utilizes the methods and systems described elsewhere herein to predict and output a substantially similar and visually matching set of color model values for the target foreground color 970.

Computer Systems

Figure 10:
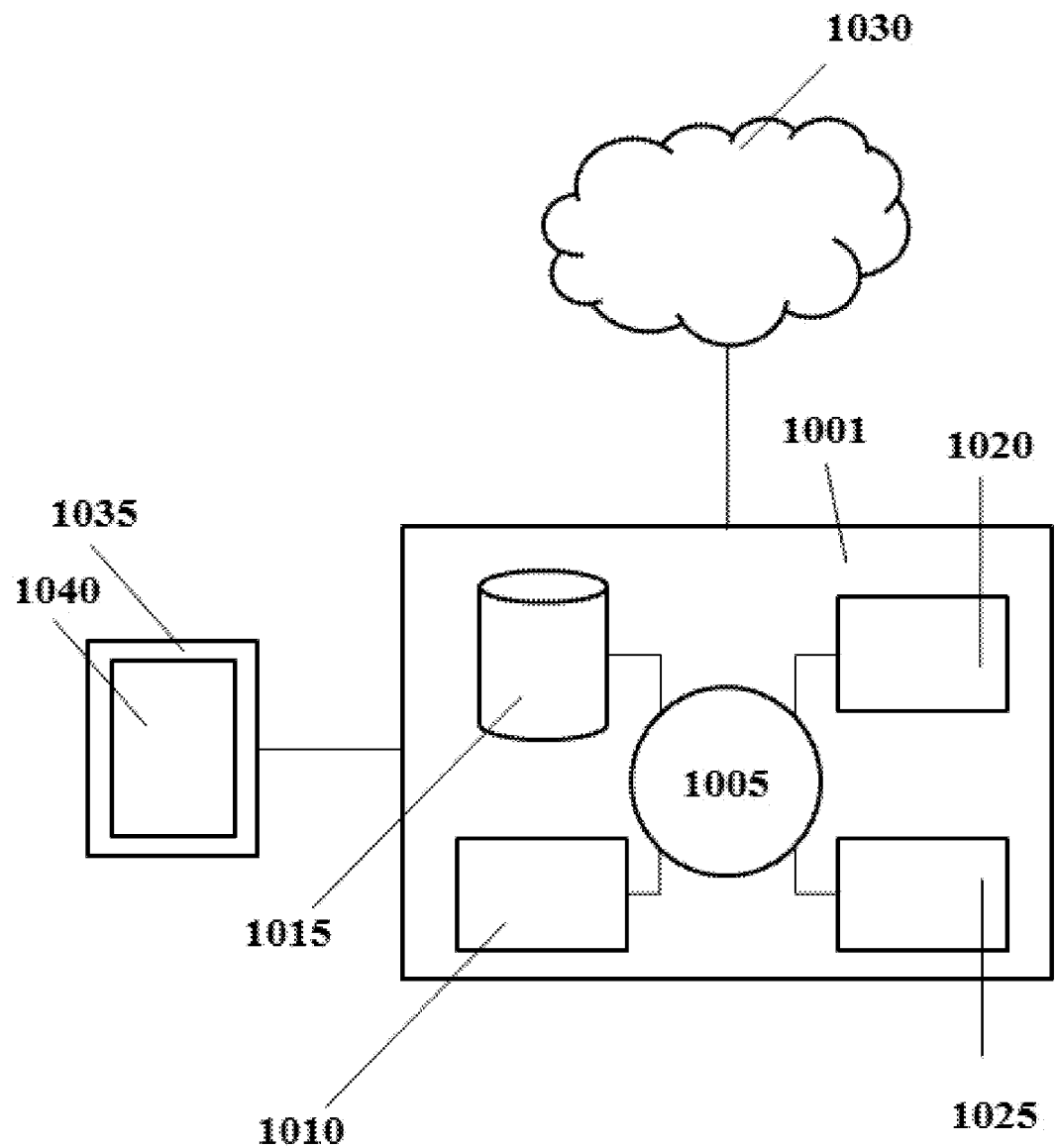
FIG. 10 shows a computer system that is programmed or otherwise configured to implement methods provided herein.

The present disclosure provides computer systems that are programmed to implement methods of the disclosure. FIG. 10 shows a computer system 1001 that is programmed or otherwise configured to predict the color of an object on a different colored background using machine learning of user input data and color modeling. The computer system 1001 can regulate various aspects of the color predicting system of the present disclosure, such as, for example, the machine learning algorithm, smart engine, analysis engine, and/or color prediction engine, etc. The computer system 1001 can be an electronic device of a user or a computer system that is remotely located with respect to the electronic device. The electronic device can be a mobile electronic device.

The computer system 1001 includes a central processing unit (CPU, also "processor" and "computer processor" herein) 1005, which can be a single core or multi core processor, or a plurality of processors for parallel processing. The computer system 1001 also includes memory or memory location 1010 (e.g., random-access memory, read-only memory, flash memory), electronic storage unit 1015 (e.g., hard disk), communication interface 1020 (e.g., network adapter) for communicating with one or more other systems, and peripheral devices 1025, such as cache, other memory, data storage and/or electronic display adapters. The memory 1010, storage unit 1015, interface 1020 and peripheral devices 1025 are in communication with the CPU 1005 through a communication bus (solid lines), such as a motherboard. The storage unit 1015 can be a data storage unit (or data repository) for storing data. The computer system 1001 can be operatively coupled to a computer network ("network") 1030 with the aid of the communication interface 1020. The network 1030 can be the Internet, an internet and/or extranet, or an intranet and/or extranet that is in communication with the Internet. The network 1030 in some cases is a telecommunication and/or data network. The network 1030 can include one or more computer servers, which can enable distributed computing, such as cloud computing. The network 1030, in some cases with the aid of the computer system 1001, can implement a peer-to-peer network, which may enable devices coupled to the computer system 1001 to behave as a client or a server.

The CPU 1005 can execute a sequence of machine-readable instructions, which can be embodied in a program or software. The instructions may be stored in a memory location, such as the memory 1010. The instructions can be directed to the CPU 1005, which can subsequently program or otherwise configure the CPU 1005 to implement methods of the present disclosure. Examples of operations performed by the CPU 1005 can include fetch, decode, execute, and writeback.

The CPU 1005 can be part of a circuit, such as an integrated circuit. One or more other components of the system 1001 can be included in the circuit. In some cases, the circuit is an application specific integrated circuit (ASIC).

The storage unit 1015 can store files, such as drivers, libraries and saved programs. The storage unit 1015 can store user data, e.g., user preferences and user programs. The computer system 1001 in some cases can include one or more additional data storage units that are external to the computer system 1001, such as located on a remote server that is in communication with the computer system 1001 through an intranet or the Internet.

The computer system 1001 can communicate with one or more remote computer systems through the network 1030. For instance, the computer system 1001 can communicate with a remote computer system of a user (e.g., a color predictor device manager, a color predictor device user, a color predictor device data acquirer, a color predictor device data scribe, etc.). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 1001 via the network 1030.

Methods as described herein can be implemented by way of machine (e.g., computer processor) executable code stored on an electronic storage location of the computer system 1001, such as, for example, on the memory 1010 or electronic storage unit 1015. The machine executable or machine readable code can be provided in the form of software. During use, the code can be executed by the processor 1005. In some cases, the code can be retrieved from the storage unit 615 and stored on the memory 1010 for ready access by the processor 1005. In some situations, the electronic storage unit 1015 can be precluded, and machine-executable instructions are stored on memory 1010.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 1001, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1001 can include or be in communication with an electronic display 1035 that comprises a user interface (UI) 1040 for providing, for example, a login screen for an administrator to access software programmed to control the color predictor device operation and functionality. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 1005. The algorithm can, for example, be component of software described elsewhere herein and may modulate color predictor device operating parameters (e.g., machine learning algorithm, machine learning training models, image parsing, data analysis, etc.), process and receive data, receive inputs from a user, output data to a user, etc.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

EXAMPLES

Example 1: Auditing Image Color Model Values

In this example, the smart model is trained by user input where the user is presented with an image that has a foreground object with color model values (e.g. RGB 252, 154, 61) and a background with color model values (e.g. RGB 211, 102, 155). The user is also presented with a second background with color model values (e.g. RGB 134, 19, 40). The user then adjusts the color of a second foreground object (e.g. RGB 233, 154, 80) on the second background until the user believes they have visually matched the color model values of the first foreground square on the separate background with different color model values. The color model values are all stored into a text file. The auditor then reviews the color model values selected by the user and agrees to it, declines, or changes the color model values. These steps are repeated with a variety of different color model value combinations from a variety of different users until the auditor has determined adequate data has been obtained.

Example 2: Analysis Modeling of Audited Image Color Model Values

In this example, audited data is utilized as inputs for the analysis model. The analysis engine uses the audited data to generate parameters (e.g. coefficients, weights) for the color prediction engine. The analysis model uses a RGB model that describes the RGB values of the first foreground object, first background, second background, and second foreground object and a least squares analysis function to determine the quality of color model values (e.g. whether more color model values are needed to determine visually matching color model values). The analysis model comprises a red analysis, green analysis, and a blue analysis that determines a fit and parameters for each set of color model values.

Example 3: Final Product Color Generation

In this example, the parameters generated by the analysis model are utilized by the color prediction model to generate final color model values. The color prediction model engine is fed color model values for a first foreground object (e.g. RGB 197, 21, 133), a first background (e.g. RGB 208, 253, 241), and a target background (e.g. RGB 94, 0, 247) along with the parameters from the analysis model to predict the final color model values of the second foreground object (e.g. RGB 156, 0, 122).

What is claimed is:

1. A computer-implemented method for predicting an optimal color, the method comprising;
    receiving an input image comprising a first foreground object having a first color, wherein said first foreground object is superimposed on a first background having a second color;
    receiving a target image comprising a target foreground object superimposed on a target background; and
    using a color prediction model to predict a target foreground color for the target foreground object and/or a target background color for the target background object,
    wherein a visual color perception of (1a) the target foreground object having said target foreground color relative to (1b) the target background having said target background color in said target image, and (2a) the first foreground object having said first color relative to (2b) the first background having said second color in said input image, appears substantially similar to an observer.

2. The method of claim 1, wherein said visual color perception comprises RGB values are each within about 1% to 30%.

3. The method of claim 1, wherein substantially similar means said target image appears to be indistinguishable from the input image.

4. The method of claim 1, further comprising: modifying the target foreground object to have the predicted target foreground color.

5. The method of claim 1, further comprising: modifying the target background object to have the predicted target background color.

6. The method of claim 4, wherein modifying comprises adjusting the RGB values.

7. The method of claim 1, wherein said color prediction model comprises machine learning.

8. The method of claim 1, wherein a color ratio of the target image is substantially proportional to a color ratio of the input image.

9. The method of claim 1, wherein said first color and said second color are different.

10. The method of claim 1, wherein said first color and said target foreground color are different.

11. The method of claim 1, wherein said first color and said target background color are different.

12. The method of claim 1, wherein said second color and said target background color are different.

13. The method of claim 1, wherein said target foreground color and said target background color are different.

14. The method of claim 1, wherein said first color, said second color, said target foreground color, and said target background color are all different colors.

15. The method of claim 1, wherein said first image and said target image are displayed on a user interface.

16. The method of claim 1, wherein said first image and said target image are displayed on a computer device, wherein said computer device comprising of smart phones, laptops, desktops, and television monitors.

17. The method of claim 1, wherein said observer is a human or computer system.

18. A method for color prediction, comprising:
    displaying a plurality of images on a graphical user interface to a user, wherein the plurality of images comprises (1) a first set of baseline images and (2) a second set of adjustable images;
    receiving input RGB values for the second set of adjustable images as the user adjusts/varies the RGB values over a scale such that a color ratio in the adjusted set of second images appears substantially similar to a color ratio in the first set of baseline images; and
    generating a color prediction model based at least on the input RGB values, wherein the color prediction model is configured to predict target foreground and/or background colors for any target image comprising a foreground object superimposed onto a background object.

19. A system for color prediction, comprising:
    computer memory configured to receive (1) an input image comprising a first foreground object having a first color, wherein said first foreground object is superimposed on a first background having a second color; and (2) a target image comprising a target foreground object superimposed on a target background; and
    one or more computer processors operatively coupled to said computer memory and configured to use a color prediction model to predict a target foreground color for the target foreground object and/or a target background color for the target background object,
    wherein a visual color perception of (1a) the target foreground object having said target foreground color relative to (1b) the target background having said target background color in said target image, and (2a) the first foreground object having said first color relative to (2b)

the first background having said second color in said input image, appears substantially similar to an observer.

20. The system of claim 19, further comprising said one or more computer processors are individually or collectively programmed to modify the target foreground object to have the predicted target foreground color.

\* \* \* \* \*